United States Patent
Albertson et al.

(10) Patent No.: US 7,792,328 B2
(45) Date of Patent: Sep. 7, 2010

(54) WARNING A VEHICLE OPERATOR OF UNSAFE OPERATION BEHAVIOR BASED ON A 3D CAPTURED IMAGE STREAM

(75) Inventors: Jacob C. Albertson, Newton, MA (US); Kenneth C. Arnold, Ellicott City, MD (US); Steven D. Goldman, Chesterfield, MO (US); Michael A. Paolini, Austin, TX (US); Anthony J. Sessa, Quogue, NY (US)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 11/622,684

(22) Filed: Jan. 12, 2007

(65) Prior Publication Data
US 2008/0169914 A1 Jul. 17, 2008

(51) Int. Cl.
G06K 9/00 (2006.01)
G08B 23/00 (2006.01)
G05D 1/00 (2006.01)

(52) U.S. Cl. .................. 382/104; 382/107; 382/154; 340/576; 701/1

(58) Field of Classification Search ............... None
See application file for complete search history.

(56) References Cited

U.S. PATENT DOCUMENTS

| | | |
|---|---|---|
| 5,103,305 A | 4/1992 | Watanabe |
| 5,109,425 A | 4/1992 | Lawton |
| 5,454,043 A | 9/1995 | Freeman |
| 5,502,803 A | 3/1996 | Yoshida et al. |
| 5,581,276 A | 12/1996 | Cipolla et al. |
| 5,691,693 A * | 11/1997 | Kithil .................. 340/439 |
| 5,714,698 A | 2/1998 | Tokioka et al. |

(Continued)

FOREIGN PATENT DOCUMENTS

CN 1655197 A 8/2005

(Continued)

OTHER PUBLICATIONS

Alan Yuille, "Computer Vision Systems for the Blind and Visually Disabled", UCLA Dept. Statistics and Psychology, 4 pages, [online], [print accessed on Aug. 18, 2006]. Retrieved from the internet < www.stat.ucla.edu/~yuille/courses/FIAT_Stat19/fiat3.ppt>.

(Continued)

*Primary Examiner*—Charles Kim
(74) *Attorney, Agent, or Firm*—David A. Mims, Jr.; Amy J. Pattillo

(57) ABSTRACT

A computer-implemented method, system, and program product includes a behavior processing system for capturing a three-dimensional movement of an operator of a vehicle, wherein the three-dimensional movement is determined by using at least one image capture device aimed at the operator, and identifying at least one behavior of the operator from the captured three-dimensional movement. An operator monitoring system for a vehicle determines whether the predicted behavior and the current operational state of the vehicle indicate unsafe operation of the vehicle and the operator monitoring system notifies the operator when unsafe operator of the vehicle is indicated by the operator's behavior for the current operational state of the vehicle.

17 Claims, 7 Drawing Sheets

U.S. PATENT DOCUMENTS

| | | | |
|---|---|---|---|
| 5,880,731 A | 3/1999 | Liles et al. | |
| 5,930,378 A | 7/1999 | Kubota et al. | |
| 6,002,808 A | 12/1999 | Freeman | |
| 6,049,747 A * | 4/2000 | Nakajima et al. | 701/45 |
| 6,072,494 A | 6/2000 | Nguyen | |
| 6,115,053 A | 9/2000 | Perlin | |
| 6,154,558 A | 11/2000 | Hsieh | |
| 6,181,343 B1 | 1/2001 | Lyons | |
| 6,215,890 B1 | 4/2001 | Matsuo et al. | |
| 6,295,367 B1 | 9/2001 | Crabtree et al. | |
| 6,301,370 B1 | 10/2001 | Steffens et al. | |
| 6,421,453 B1 | 7/2002 | Kanevsky | |
| 6,577,937 B1 | 6/2003 | Shuman | |
| 6,674,877 B1 | 1/2004 | Jojic et al. | |
| 6,766,036 B1 | 7/2004 | Pryor | |
| 6,784,901 B1 | 8/2004 | Harvey et al. | |
| 6,788,809 B1 | 9/2004 | Grzeszczuk et al. | |
| 6,859,144 B2 * | 2/2005 | Newman et al. | 340/576 |
| 7,039,676 B1 | 5/2006 | Day et al. | |
| 7,058,204 B2 | 6/2006 | Hildreth et al. | |
| 7,068,843 B2 | 6/2006 | Chang et al. | |
| 7,224,830 B2 | 5/2007 | Nefian et al. | |
| 7,274,800 B2 | 9/2007 | Nefian et al. | |
| 2002/0004629 A1 | 1/2002 | Natori | |
| 2002/0118880 A1 | 8/2002 | Liu | |
| 2002/0152010 A1 | 10/2002 | Colmenarez | |
| 2003/0058111 A1 | 3/2003 | Lee et al. | |
| 2003/0076300 A1 | 4/2003 | Lauper | |
| 2003/0113018 A1 | 6/2003 | Nefian | |
| 2003/0142068 A1 | 7/2003 | DeLuca | |
| 2003/0156756 A1 | 8/2003 | Gortuk | |
| 2003/0227453 A1 | 12/2003 | Beier et al. | |
| 2004/0032970 A1 | 2/2004 | Kiraly | |
| 2004/0161132 A1 | 8/2004 | Cohen et al. | |
| 2004/0228503 A1 | 11/2004 | Cutler | |
| 2005/0030184 A1 * | 2/2005 | Victor | 340/576 |
| 2005/0069852 A1 | 3/2005 | Janakiraman et al. | |
| 2005/0166163 A1 | 7/2005 | Chang | |
| 2005/0206610 A1 | 9/2005 | Cordelli | |
| 2005/0210419 A1 | 9/2005 | Kela et al. | |
| 2006/0013440 A1 | 1/2006 | Cohen | |
| 2006/0097857 A1 * | 5/2006 | Osaka et al. | 340/435 |
| 2006/0181518 A1 | 8/2006 | Shen et al. | |
| 2006/0181519 A1 | 8/2006 | Vernier et al. | |
| 2006/0210112 A1 | 9/2006 | Cohen et al. | |
| 2007/0063855 A1 * | 3/2007 | Maass | 340/576 |
| 2008/0040692 A1 | 2/2008 | Sunday et al. | |
| 2008/0068187 A1 * | 3/2008 | Bonefas et al. | 340/575 |

FOREIGN PATENT DOCUMENTS

| | | | |
|---|---|---|---|
| EP | 0905644 A | | 3/1999 |
| EP | 0991011 A | | 4/2000 |
| EP | 1723901 A | | 11/2006 |
| EP | 1723901 A1 * | | 11/2006 |
| FR | 2784887 A | | 4/2000 |
| WO | 0002187 A | | 1/2000 |
| WO | 2004108466 A | | 12/2004 |

OTHER PUBLICATIONS

"What is Photosynth", Microsoft Live Labs, copyright Microsoft Corporation 2006, 1 page, [online], [print accessed on Aug. 18, 2006]. Retrieved from the internet <http://labs.live.com/photosynth/whatis/>.

"What is Synthetic Aperture Radar", 3 pages, copyright 2005, Sandia Corporation, [online], [print accessed on Aug. 18, 2006]. Retrieved from the Internet <http://www.sandia.gov/RADAR/whatis.html>.

"Accelerometer", 3 pages, copyright Wikipedia, [online], [print accessed on Oct. 31, 2006], [last modified on Oct. 24, 2006]. Retrieved from the internet <http://enwikipedia.org/wiki/Accelerometer>.

Eric Lipton, "Faces, Too are Searched as U.S. Airports Try to Spot Terrorists", 1 page, The New York Times, Aug. 17, 2006.

"Method for Access Control Via Gesural Verification", IBM Technical Disclosure Bulletin, IBM Corp, New York, US, vol. 36, No. 9B, Sep. 1, 1993, pp. 487-488, 2 pages.

Black, MJ et al, "Recognizing Temporal Trajectories Using the Condensation Algorithm", Automatic Face and Gesture Recognition, 1998, Proceedings from the Third IEEE International Conference on Nara, Japan, Apr. 1998, Los Alamitos CA, USA, IEEE Comuting Society, pp. 16-21, 6 pages.

Jacob C Albertson et al, "Warning A User About Adverse Behaviors of Others Within an Environment Based on a 3D Captured Image Stream", U.S. Appl. No. 11/622,676, filed Jan. 12, 2007.

Jacob C Albertson et al, "Adjusting A Consumer Experience Based on a 3D Captured Image Stream of a Consumer Response", U.S. Appl. No. 11/622,679, filed Jan. 12, 2007.

Jacob C Albertson et al, "Tracking A Range of Body Movement Based on 3D Captured Image Streams of a User", U.S. Appl. No. 11/622,685, filed Jan. 12, 2007.

Jacob C Albertson et al, "Controlling Resource Access Based on User Gesturing in a 3D Captured Image Stream of the User", U.S. Appl. No. 11/622,687, filed Jan. 12, 2007.

Jacob C Albertson et al, "Controlling a Document Basd on User Behavioral Signals Detected form a 3D Captured Image Stream", U.S. Appl. No. 11/622,690, filed Jan. 12, 2007.

Jacob C Albertson et al, "Controlling a System Based on User Behavioral Signals Detected from a 3D Captured Image Stream", U.S. Appl. No. 11/622,693, filed Jan. 12, 2007.

Jacob C Albertson et al, "Assisting a Vision-Impaired User with navigation Based on a 3D Captured Image Stream", U.S. Appl. No. 11/622,696, filed Jan. 12, 2007.

Jacob C Albertson et al, "Informing a User of Gestures Made by Others Out of the User's Line of Sight", U.S. Appl. No. 11/470,421, filed Sep. 6, 2006.

USPTO Office Action, Dated Jun. 25, 2009 In Re Albertson (U.S. Appl. No. 11/470,421, filed Sep. 6, 2006), pp. 1-20.

USPTO Notice of Allowance, Dated Dec. 14, 2009, In Re Albertson (U.S. Appl. No. 11/470,421, filed Sep. 6, 2006), pp. 1-13.

USPTO Office Action, Dated Jan. 14, 2010, In Re Albertson (U.S. Appl. No. 11/622,693, filed Jan. 12, 2007), pp. 1-23.

USPTO Office Action, Dated Mar. 22, 2010, In Re Albertson (U.S. Appl. No. 11/622,690, filed Jan. 12, 2007), 30 Pages.

USPTO Office Action, Dated Mar. 30, 2010, In Re Albertson (U.S. Appl. No. 11/622,685, filed Jan. 12, 2007, 28 Pages.

USPTO Notice of Allowance, Dated Apr. 23, 2010, In Re Albertson (U.S. Appl. No. 11/622,693, filed Jan. 12, 2007), pp. 1-14.

* cited by examiner

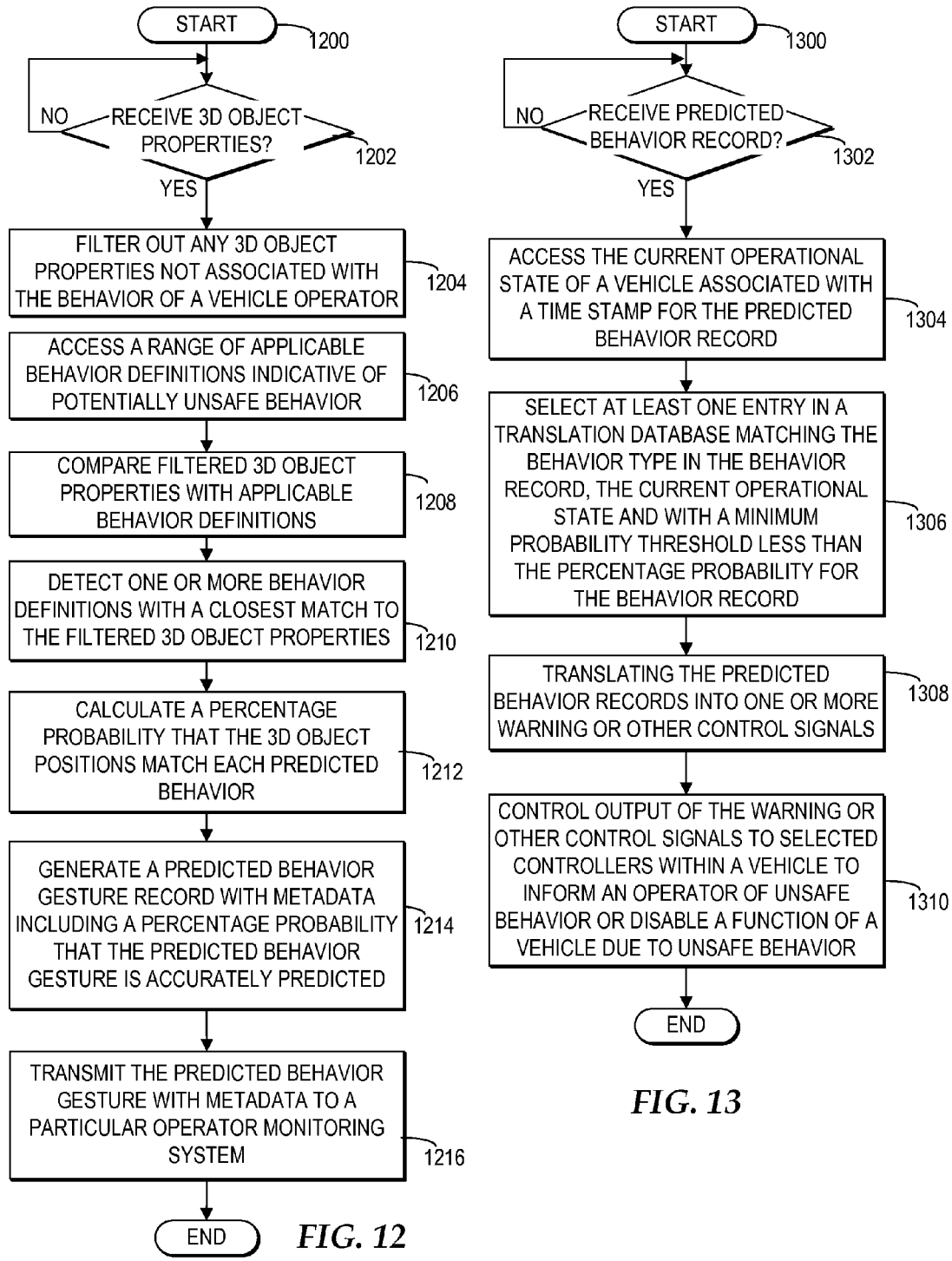

WARNING A VEHICLE OPERATOR OF UNSAFE OPERATION BEHAVIOR BASED ON A 3D CAPTURED IMAGE STREAM

TECHNICAL FIELD

The present invention relates in general to providing improved vehicle operation warning signals. In particular, the present invention relates to detecting, from a three-dimensional image stream captured by one or more image capture devices, whether behaviors of a operator of a vehicle for the current operational state of the vehicle are unsafe and notifying the operator of the unsafe condition.

DESCRIPTION OF THE RELATED ART

Many traffic accidents occur because drivers lose concentration, drive in an impaired state, or experience medical emergencies while driving. In addition, many industrial accidents occur because a user does not properly operate the equipment. While most vehicles and machinery now include one or more safety features, such as an emergency brake or a shield that a user is required to lower before turning on a saw, vehicles and other machinery do not include safety features based on the behaviors of a user operating the vehicle or machine. For example, a vehicle or other machinery may not include safety features that are triggered when a user is distracted.

Therefore, in view of the foregoing, there is a need for a method, system, and program product for monitoring a vehicle operator, predicting operator behaviors from a capture three-dimensional image stream of the vehicle operator, accessing a current operational condition of the vehicle, determining whether the operator's current behaviors for the current operational condition of the vehicle are unsafe, and notifying the operator if the behaviors are considered unsafe.

SUMMARY OF THE INVENTION

The present invention provides improved vehicle operation warning signals based on a three-dimensional captured image. The present invention provides for detecting, from a three-dimensional image stream captured by one or more image capture devices, whether behaviors of an operator of a vehicle for the current operational state of the vehicle are unsafe and notifying the operator of the unsafe condition.

In one embodiment, a computer-implemented method, system, and program product comprises a behavior processing system for capturing a three-dimensional movement of an operator of a vehicle, wherein the three-dimensional movement is determined by using at least one image capture device aimed at the operator. The behavior processing system identifies a three-dimensional object properties stream using the captured movement. The behavior processing system identifies a particular defined behavior of the operator represented by the three-dimensional object properties stream by comparing the identified three-dimensional object properties stream with multiple behavior definitions. An operator monitoring system identifies the current operational state of the vehicle and identifies whether the current defined behavior and the current operational state of the vehicle match at least one unsafe operation definition from among a plurality of unsafe operation definitions. In response to matching the at least one unsafe operation definition, the operator monitoring system notifies the operator of the type of unsafe operation currently performed based on the at least one unsafe operation definition.

In capturing the three-dimensional movement of the operator of the vehicle, the behavior processing system captures the three-dimensional movement using a stereoscopic image device to identify and track a particular three-dimensional movement of the operator. In identifying the particular defined behavior, the behavior processing system distinguishes the three-dimensional object property streams mapping to the operator movement from three-dimensional object property streams mapping to images of items carried in the vehicle, images of a passenger in the vehicle, images from outside the vehicle, and images within the interior of the vehicle. In addition, in identifying the particular defined behavior, the behavior processing system identifies body movements at a fine granularity, such as a facial expression, an eye movement, a muscle contraction, or a change in skin surface characteristics of the operator.

In identifying whether the particular defined behavior and the current operational state of the vehicle match at least one unsafe operation definition, the operation monitoring system identifies whether the current captured 3D position of the operator's head and eyes match the 3D positions of head and eyes for the current operational state in an unsafe operation definition. In identifying whether the particular defined behavior and the current operational state of the vehicle match at least one unsafe operation definition, the operation monitoring system identifies whether the current detected behavior of the operator talking on a portable telephone device during the current operational state matches the unsafe portable telephone use behavior for the current operational state in an unsafe operation definition.

In notifying the operator of the type of unsafe condition, the operator monitoring system generates at least one control signal where the control signal controls output that notifies the operator of the type of unsafe condition. The operator monitoring system generates one or more control signals for a tactile feedback output, an audio output or a graphical output and sends the control signals to controllers for controlling the requested output. In addition, the operation monitoring system generates a control signal for a vehicle function controller to request the vehicle function controller restrict the available functions of a vehicle.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 12 is a high level logic flowchart depicting a process and program for a behavior interpreter system of a behavior processing system enabling behavior prediction from tracked 3D object properties; and FIG. 13 is a high level logic flowchart illustrating a process and program for applying a predicted behavior record in a behavior-enabled operator monitoring system.

DETAILED DESCRIPTION OF THE PREFERRED EMBODIMENT

Figure 1:
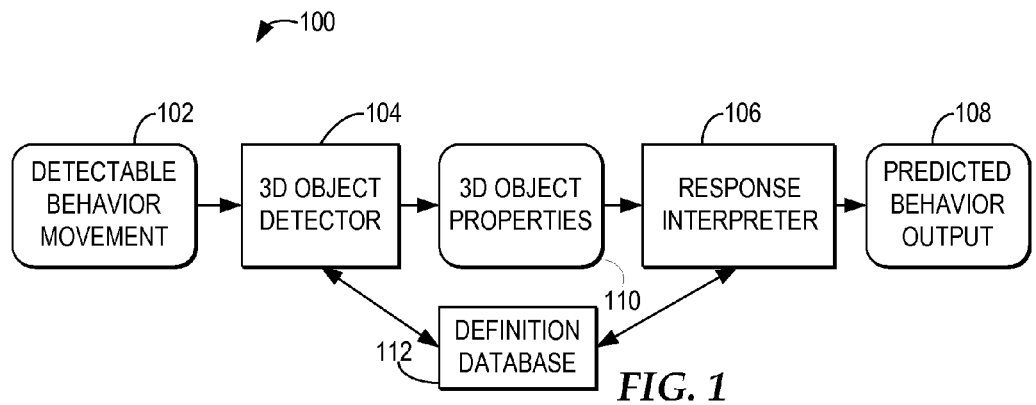
FIG. 1 is a block diagram illustrating a flow of information in a behavior processing method, system, and program product.

With reference now to FIG. 1, a block diagram illustrates a flow of information in a behavior processing method, system, and program product. It will be understood that FIG. 1 provides one embodiment of information flow for capturing image streams of the behavior of an operator of a vehicle and processing those image streams to identify predicted behaviors of monitored users and to predict whether the behaviors are unsafe in view of the current operational state of the vehicle, however, other information flows may be implemented to process captured data and predict behaviors and whether the behaviors are unsafe in view of the current operational state of the vehicle.

It is important to note that as used throughout, the term "behavior" may include user actions typically labeled as behavior or body language, such as gesturing and facial expressions, and may also include any detectable body movements, detectable body posture, detectable eye movements, changes in skin surface characteristics such as color, temperature, tone, and level of perspiration, changes in muscle contraction, and other types of non-verbal communication. The term "unsafe behavior", as used throughout, may include any behavior, but is used throughout with reference to behavior predicted as impairing safe operation of a vehicle. Although the term "vehicle" is used throughout, it is important to note that the present invention may apply for any mechanized or motorized system controlled by an operator, including, but not limited to, a car, a boat, an airplane, and stationary heavy machinery, such as a band saw.

In the example, a behavior processing system 100 includes a three-dimensional (3D) object detector 104. 3D object detector 104 represents multiple systems for capturing images and other data about moving and stationary objects, streamlining the captured data, tracking particular objects within the captured movement, streaming the properties of the particular objects, and combining the streamed properties into a three-dimensional representation of the 3D characteristics of the captured objects, as illustrated by 3D object properties 110. 3D object properties 110 may include, but are not limited to, positions, color, size, and orientation, representative of movement by an operator of a vehicle, passengers within a vehicle, fixed parts of the vehicle, items carried within a vehicle, other objects within an environment, and the background identifying attributes of an environment, for example.

In the example, 3D object detector 104 captures images within a focus area, represented as detectable behavior movement 102. In addition, 3D object detector 104 may detect other types of data within a focus area. In particular, 3D object detector 104 detects detectable behavior movement 102 through multiple types of image and data detection including, but not limited to, capturing video images, detecting body part movement, detecting skin texture, detecting eye movement, detecting skin surface characteristics, and capturing thermal images. For supporting multiple types of image and data detection, 3D object detector 104 may include multiple types of image capture devices, including one or more video cameras arranged for stereoscope video image capture, and other types of sensors for capturing at least one other characteristic of one or more objects, such as thermal body imaging sensors, skin texture sensors, laser sensing devices, sound navigation and ranging (SONAR) devices, or synthetic laser or sonar systems. In particular, a sensor may be implemented using a separate sensor unit or may be implemented through a logic unit that operates on a captured image stream. For example, a logic unit may process the captured image stream to detect facial skin textures distinguishable from non-skin textures, such as a smooth wall or textured foliage, within a focus area.

Portions of detectable behavior movement 102 may include images and other data representative of actual behaviors by an operator or others and other portions of detectable behavior movement 102 may include images and data not representative of behaviors. In particular, detectable behavior movement 102 may include movement by an operator of a vehicle, passengers within a vehicle, fixed parts of the vehicle, items carried within a vehicle, other objects within an environment, and the background identifying attributes of an environment. 3D object detector 104 translates detectable behavior movement 102 into a stream of 3D properties of detected objects and passes the stream of 3D object properties 110 to behavior interpreter 106. Behavior interpreter 106 maps the streamed 3D object properties 110 into one or more behaviors, detects which behaviors are behaviors of an operator of a vehicle, and estimates, for each predicted behavior of a monitored operator, the probability that the actual behavior in detectable behavior movement 102 is correctly predicted by behavior interpreter 106.

Behavior interpreter 106 outputs each predicted behavior for an operator of a vehicle and the percentage probability that the behavior is correctly predicted as predicted behavior output 108. Behavior interpreter 106 may pass predicted behavior output 108 to one or more behavior-enabled applications at one or more systems. In particular, according to an advantage of the present invention, behavior interpreter passes predicted behavior output 108 to a behavior-enabled operator monitoring system that monitors the behavior of an operator of a vehicle in correlation with the current operational state of the vehicle, determines whether current behavior is unsafe, and is enabled to trigger one or more of a warning signal to the operator and controlling one or more of the functions of the vehicle if the current behavior is unsafe. In addition, however, behavior interpreter 106 may pass predicted behavior output 108 to one or more other types of behavior-enabled application that interpret the predicted behaviors.

In particular, in processing detectable behavior movement 102 and generating predicted behavior output 108, 3D object detector 104 and behavior interpreter 106 may access a behavior database 112 of previously accumulated and stored behavior definitions to better track and detect, within 3D object properties 110, those monitored objects representative of behaviors, to better recognize an operator separate from other objects and passengers within detectable behavior movement 102.

In addition, in processing behavior movement 102 and generating predicted behavior output 108, 3D object detector 104 and behavior interpreter 106 may access behavior database 112 with behavior definitions specified for the type of behavior-enabled application to which predicted behavior output 108 will be output. For example, in the present embodiment, predicted behavior output 108 may be output to an operator monitoring system, for the operator monitoring system to convert into warning signals or control signals, such that behavior interpreter 106 attempts to predict a type of behavior from a detected object movement that most closely resembles the types of behaviors that have been determined to be more likely representative of unsafe behavior.

Further, in processing behavior movement 102 and generating predicted behavior output 108, 3D object detector 104 and behavior interpreter 106 attempt to identify objects representative of monitored operator behaviors and predict the type of behavior in view of the overall interaction in which the behavior is made. Thus, 3D object detector 104 and behavior interpreter 106 attempt to determine not just a behavior, but a level of emphasis included in a behavior that would effect the meaning of the behavior, a background of an operator making a behavior that would effect the meaning of the behavior, the environment in which the operator makes the behavior that would effect the meaning of the behavior, combinations of behaviors made together that effect the meaning of each behavior and other detectable factors that effect the meaning of a behavior. Thus, behavior database 112 includes behaviors definitions corresponding different types of people, environments, and other factors that may affect the meaning of a behavior. In addition, behavior database 112 includes behavior definitions adjusted according to a corresponding facial expression or other corresponding behavior. Further, behavior database 112 may be trained to more accurately identify operators, passengers, and things that most commonly travel in a particular vehicle and to more accurately identify objects representing behaviors by a vehicle operator that may represent unsafe behavior.

In addition, in processing behavior movement 102, multiple separate systems of image capture devices and other sensors may each capture image and data about separate or overlapping focus areas from different angles. The separate systems of image capture devices and other sensors may be communicatively connected via a wireless or wired connection and may share captured images and data with one another, between 3D behavior detectors or between behavior interpreters, such that with the combination of data, behavior interpreter 106 may interpreter behaviors with greater accuracy.

Figure 2:
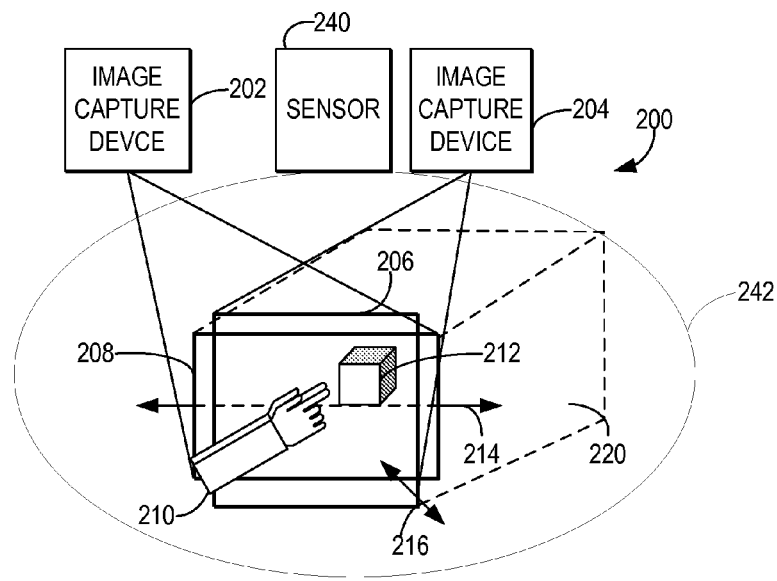
FIG. 2 is an illustrative block diagram depicting an example of an environment in which a 3D object detector captures and generates the 3D object properties representative of captured behavior movement.
Figure 8:
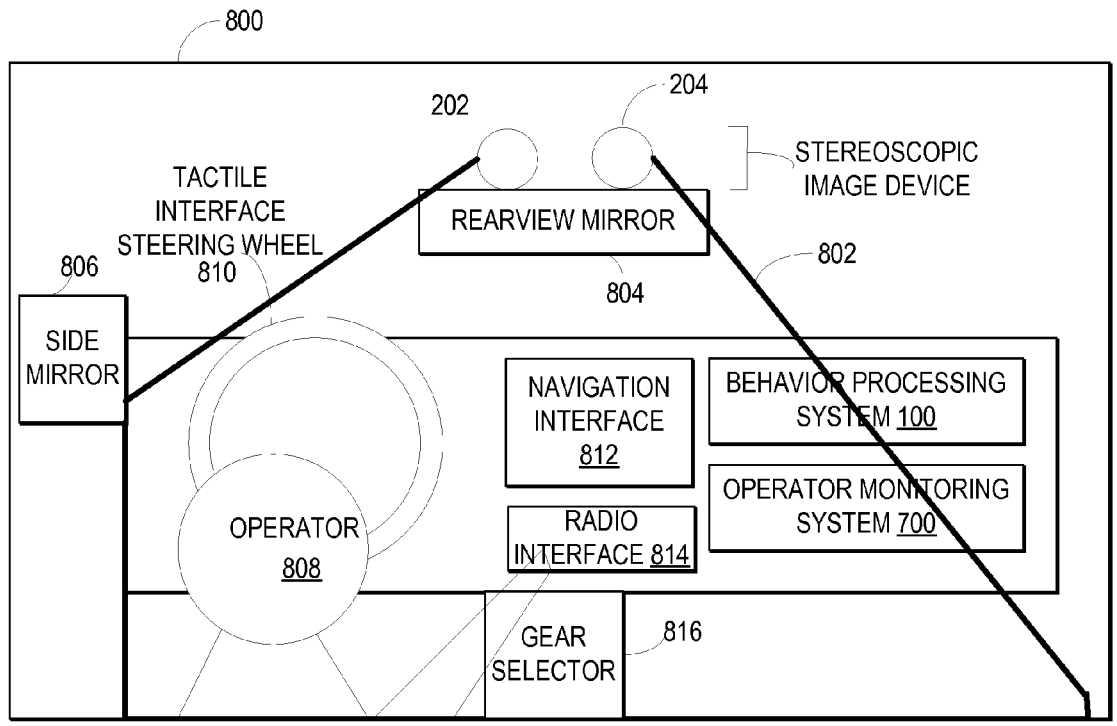
FIG. 8 is a block diagram depicting one example of a behavior processing system implemented within a vehicle for identifying behaviors of an operator from captured 3D image streams and an operator monitoring system for controlling warnings and other control signals for the vehicle based on the predicted behaviors.

Referring now to FIG. 2, an illustrative diagram depicts an example of an environment in which a 3D object detector captures and generates the 3D object properties representative of captured behavior movement. It will be understood that detectable movement environment 200 is one example of an environment in which 3D object detector 104 detects images and data representative of detectable behavior movement 102, as described with reference to behavior processing system 100 in FIG. 1. More specifically, as will be further described, FIG. 8 illustrates an environment in which behavior movement is detected and processed within a vehicle.

In the example, detectable movement environment 200 includes a stereoscopic image device comprising an image capture device 202 and an image capture device 204, each positioned to detect movement of one or more objects, including an operator of a vehicle, fixed parts of a vehicle and additional items being carried in the vehicle, within a combined 3D focus area 220. In the depicted embodiment, image capture device 202 and image capture device 204 may each be positioned on one stationary axis or separate stationary axis, such that the area represented by 3D focus area 220 remains constantly focused upon. In addition, in the depicted embodiment, image capture device 202 and image capture device 204 and any other sensors may be positioned in parallel, at tangents, or at any other angles to control the span of and capture images within 3D focus area 220.

In another embodiment, image capture device 202 and image capture device 204 may each be positioned on a position adjustable axis or the actual focus point of image capture device 202 and image capture device 204 may be adjustable, such that the area represented by 3D focus area 220 may be repositioned. In one example, each of image capture device 202 and image capture device 204 may be coupled with one or more thermal imaging devices that detect thermal imaging based movement within a broad area and directs the repositioning of the focus area of each of image capture device 202 and image capture device 204 to track the thermal movement within the focus area of each camera.

In particular, as will be further described with reference to FIG. 8 and throughout, image capture device 202 and image capture device 204 may be affixed within a vehicle to capture a particular 3D focus area 220 including, but not limited to, capturing all or portions of the operator of the vehicle, passengers within the vehicle, the interior of the vehicle, the exterior of the vehicle, and areas outside the vehicle. In addition, in the present embodiment, image capture device 202 and image capture device 204 may be affixed to an apparatus that is carried by or worn by a vehicle operator. For example, image capture device 202 and image capture device 204 may be affixed to a pair of glasses or other headwear for a vehicle operator or a passenger, such that 3D focus area 220 changes as the person wearing the glasses moves.

Although not depicted, in another embodiment, only a single video camera, such as image capture device 202, may be implemented as a stereoscopic image device. The single video camera is placed on a track or other adjustable axis and a controller adjusts the position of the single video camera along the track, wherein the single video camera then captures a stream of video images within a focus area at different positioned points along the track and 3D behavior detector 104 combines the stream of images into a 3D object property stream of the properties of detectable objects. In one example, the 3D object property stream can be generated from comparing the changes in luminance and shadowing across the frames as the camera changes in position. Alternatively, a stereoscopic image device may be implemented using a single fixed camera coupled with a sensor that detects depth.

In addition, alternatively, a single camera enabled to process images and detect depth from a fixed position may function as a stereoscopic image device. For example, the single camera may process images and detect depth from detecting the movement of a light source and comparing changes in luminance and shadowing across the captured image frames. In particular, the single camera system may first map a model of a monitored face, focusing on the eyes, mouth, and nose and then detect changes in luminance and shadowing across image frames to detect depth characteristics of the face. In other examples, a system may process a captured stream of video images to extract depth from other characteristics of the stream of images.

For purposes of example, 3D focus area 220 includes a first capture plane 206, captured by image capture device 202 and a second capture plane 208, captured by image capture device 204. First capture plane 206 detects movement within the plane illustrated by reference numeral 214 and second capture plane 208 detects movement within the plane illustrated by reference numeral 216. Thus, for example, image capture device 202 detects movement of an object side to side or up and down and image capture device 204 detects movement of an object forward and backward within 3D focus area 220. It is important to note that when the movement of an object is tracked at a fine granularity, even small adjustments in the body movement such as a raised eyebrow, a jaw thrust forward, or an irregular eye movement, of a monitored operator are tracked and can then be interpreted as indicative of unsafe behavior. In addition, it is important to note that when the movement of an object is tracked at a fine granularity, any obstruction to tracking fine movement, such as prescription glasses or sunglasses that distort or inhibit tracking eye movement, can be tracked and analyzed in interpreting eye movement indicative of unsafe behavior.

In the example, within 3D focus area 220, a hand 210 represents a moving object and a box 212 represents a stationary object. In the example, hand 210 is the portion of a person's hand within 3D focus area 220. A monitored operator may make any number of movements, some representative of unsafe behaviors, by moving hand 210.

As a person moves hand 210 within 3D focus area 220, each of image capture device 202 and image capture device 204 capture a video stream of the movement of hand 210 within capture plane 206 and capture plane 208. From the video streams, 3D object detector 104 detects hand 210 as a moving object within 3D focus area 220 and generates a 3D property stream, representative of 3D object properties 110, of hand 210 over a period of time.

In addition, a person may move hand 210 in relation to box 212 or another object. For example, a user may point or make another type of behavior directed to box 212. As the person moves hand 210 within 3D focus area 220, the video streams captured by image capture device 202 and image capture device 204 include the movement of hand 210 and box 212. From the video streams, 3D object detector 104 detects hand 210 as a moving object and box 212 as a stationary object within 3D focus area 220 and generates 3D object property streams indicating the 3D properties of box 212 and the 3D properties of hand 210 in relation to box 212 over a period of time.

It is important to note that by capturing different planes of movement within 3D focus area 220 using multiple cameras, more points of movement are captured than would occur with a typical stationary single camera. By capturing more points of movement from more than one angle, 3D object detector 104 can more accurately detect and define a 3D representation of stationary objects and moving objects, including behaviors, within 3D focus area 220. In addition, the more accurately that 3D object detector 104 defines a 3D representation of a moving object, the more accurately behavior interpreter 106 can predict a behavior from the 3D model. For example, a behavior could consist of a person making a motion directly towards or away from one of video camera 202 and video camera 204 which would not be able to be captured in a two dimensional frame; 3D behavior detector 104 detects and defines a 3D representation of the behavior as a moving object and behavior interpreter 106 predicts the behavior made by the movement towards or away from a video camera from the 3D model of the movement.

In addition, it is important to note that while FIG. 2 illustrates a gesturing hand 210 and a stationary box 212, in alternate embodiments, 3D focus area 220 may include multiple people, such that image capture device 202 and image capture device 204 capture images of the behavior of multiple people, and 3D object detector 104 detects each behavior by each person as a separate object. In particular, 3D object detector 104 may detect, from the captured video images from image capture device 202 and image capture device 204, behaviors with more motion, such as behaviors made with hands, and behaviors made with less motion, such as facial expressions, to accurately generate 3D object properties of a person's behaviors while operating a vehicle.

In the example, in addition to capturing images within focus area 220, within detectable movement environment 200, other sensors may detect information relevant to an environment, but outside of focus area 220. For example, sensor 240 may detect information within a sensor area 242. Sensor area 242 may overlap, be incorporated within, incorporate, or be separate from focus area 220. 3D object detector 104 combines the sensed information with captured images to more accurately generate 3D object properties 110 and to provide additional information about an environment to a warning system.

In one example, sensor 240 may detect information broadcast from RFID chips placed on items within sensor area 242, where the RFID of an item broadcasts the item type, the item location, and any warning conditions associated with the item. For example, a portable telephone may include an RFID chip that broadcasts that the item is a portable telephone device By combining sensed information about the location of a particular item with captured images from which the image is identified, object detector 104 may more accurately generate 3D object properties 110 and behavior interpreter 106 may more accurately predict the types of 3D objects, such as a portable telephone, and behavior associated with the portable telephone, within 3D object properties 110. In addition, by sensor 240 accessing location information, behavior interpreter 106 may include location identifying data with a behavior record that enables a behavior-enabled system to map behaviors to particular monitored operators where multiple operators are monitored simultaneously.

In yet another example, sensor 240 may detect additional information about the depth, surface area, color temperature or other characteristic of an object to more accurately predict whether the object is representative of a particular behavior that is potentially unsafe. In particular, by detecting additional information about the depth, surface area, or other characteristic of an object, data collected by sensor 240 is combined with images captured by image capture device 202 and image capture device 204 to generate additional detail and granularity in a 3D image of an object.

Figure 3:
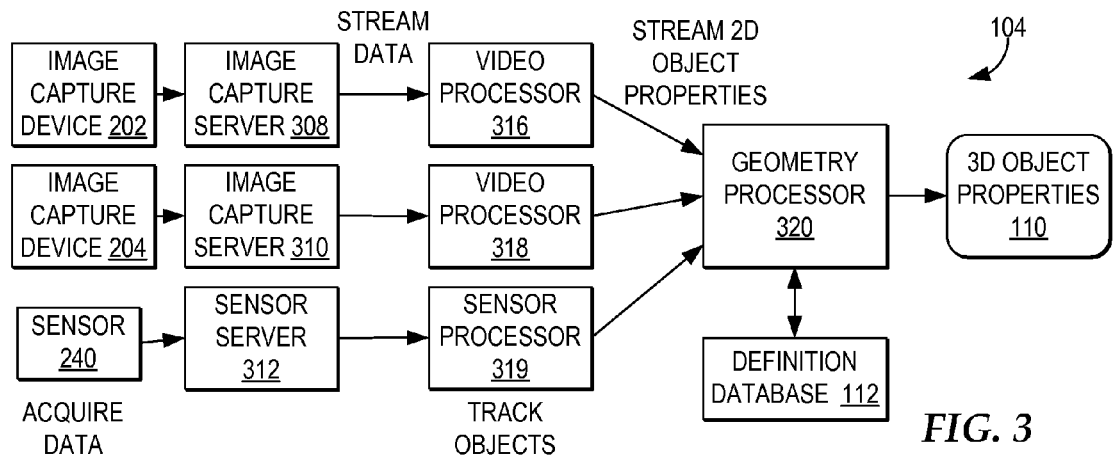
FIG. 3 is a block diagram illustrating one embodiment of a 3D object detector system for generating 3D object properties for enabling a behavior interpreter to interpret, from 3D object properties, behaviors of an operator of a vehicle.

With reference now to FIG. 3, a block diagram illustrates one embodiment of a 3D object detector system for generating 3D object properties for enabling a behavior interpreter to interpret, from 3D object properties, behaviors of an operator of a vehicle. It is important to note that the multiple components depicted within 3D object detector 104 may be incorporated within a single system or distributed via a network, other communication medium, or other transport medium across multiple systems. In addition, it is important to note that additional or alternate components from those illustrated may be implemented in 3D object detector 104 for capturing images and data and generating a stream of 3D object positions 110.

Initially, multiple image capture devices, such as image capture device 202, image capture device 204 and sensor 240, represent a stereoscopic image device for acquiring the data representative of detectable movement 102 within a 3D focus area and sensor area, such as 3D focus area 220 and sensor area 242. As previously described, image capture device 202 and image capture device 204 may represent video cameras for capturing video images. In addition, image capture device 202 and image capture device 204 may represent a camera or other still image capture device. In addition, image capture device 202 and image capture device 204 may represent other types of devices capable of capturing data representative of detectable behavior movement 102. Image capture device 202 and image capture device 204 may be implemented using the same or different types of image capture devices. In addition, the scope, size, and location of the capture area and plane captured by each of image capture device 202 and image capture device 204 may vary.

Sensor 240 detects information about objects in a particular sensor area that enhances the ability of 3D object detector 104 to create 3D object properties 110. Sensor 240 may represent one or more different types of sensors, including, but not limited to, RFID readers, thermal body imaging sensors, skin texture sensors, laser sensing devices, sound navigation and ranging (SONAR) devices, or synthetic laser or sonar systems. In addition, sensor 240 may include sensors that detect a particular type of body part, a particular type of body movement, or textures indicative of skin separate from non-skin based textures. Sensor 240 may gather independent data about an object or may process the images captured by image capture device 202 and image capture device 204.

Each of image capture device 202, image capture device 204, and sensor 240 transmit captured images and data to one or more computing systems enabled to initially receive and buffer the captured images and data. In the example, image capture device 202 transmits captured images to image capture server 308, image capture device 204 transmits captured images to image capture server 310, and sensor 240 transmits captured data to sensor server 312. Image capture server 308, image capture server 310, and sensor server 312 may be implemented within one or more server systems.

Each of image capture server 308, image capture server 310, and sensor server 312 streams the buffered images and data from image capture device 202, image capture device 204, and sensor device 240 to one or more processors. In the example, image capture server 308 streams images to a video processor 316, image capture server 310 streams images to a video processor 318, and sensor server 312 streams the sensed data to sensor processor 319. It is important to note that video processor 316, video processor 318, and sensor processor 319 may be implemented within one or more processors in one or more computer systems.

In one example, image capture server 308 and image capture server 310 each stream images to video processor 316 and video processor 318, respectively, where the images are streamed in frames. Each frame may include, but is not limited to, a camera identifier (ID) of the image capture device, a frame number, a time stamp and a pixel count.

Video processor 316, video processor 318, and sensor processor 319 are programmed to detect and track objects within image frames. In particular, because video processor 316, video processor 318, and sensor processor 319 receive streams of complex data and process the data to identify three-dimensional objects, including objects representing monitored users and supervising users, and characteristics of the three-dimensional objects, video processor 316, video processor 318, and sensor processor 319 may implement the Cell Broadband Engine (Cell BE) architecture (Cell Broadband Engine is a registered trademark of Sony Computer Entertainment, Inc.). The Cell BE architecture refers to a processor architecture which includes a base processor element, such as a Power Architecture-based control processor (PPE), connected to multiple additional processor elements also referred to as Synergetic Processing Elements (SPEs) and implementing a set of DMA commands for efficient communications between processor elements. In particular, SPEs may be designed to handle certain types of processing tasks more efficiently than others. For example, SPEs may be designed to more efficiently handle processing video streams to identify and map the points of moving objects within a stream of frames. In addition, video processor 316, video processor 318, and sensor processor 319 may implement other types of processor architecture that enables efficient processing of video images to identify, in three-dimensions, moving and stationary objects within video images from which behavior of an operator of a vehicle can be identified and the type of behavior predicted.

In the example, video processor 316, video processor 318, and sensor processor 319 each create and stream the properties, including positions, color, size, shape, and orientation, of the detected objects to a geometry processor 320. In one example, each processed frame streamed to geometry processor 320 may include, but is not limited to, a camera ID, a frame number, a time stamp, and combinations of two or more of X axis coordinates (x_loc), Y axis coordinates (y_loc), and Z axis coordinates (z_loc). It is important to note that x_loc, y_loc, and z_loc may each include multiple sets of points and other data that identify all the properties of an object. If multiple objects are detected and tracked within a single frame, the X axis coordinates and Y axis coordinates for each object may be included in a single streamed object property record or in multiple separate streamed object property records. In addition, a streamed property frame, such as the frame from sensor processor 319 for a SONAR detected position, may include Z axis location coordinates, listed as z_loc, for example.

Geometry processor 320 receives the 2D streamed object properties from video processor 316 and video processor 318 and the other object data from sensor processor 319. Geometry processor 320 matches up the streamed 2D object properties and other data and constructs 3D object properties 110 from the streamed 2D object properties and other data. In particular, geometry processor 320 constructs 3D object properties 110 that include the depth of an object. In one example, each 3D object property record constructed by geometry processor 320 may include a time stamp, an object or user movement label, X axis coordinates (x_loc), Y axis coordinates (y_loc), and Z axis coordinates (z_loc), and additional information collected from sensors. For example, additional information collected from sensors may include a location identifier received from an RFID or GPS detected location coordinates.

At any of video processor 316, video processor 318, sensor processor 319, and geometry processor 320 property records may include at least one identifier to enable persistence in tracking the object. For example, the identifier may include a unique identifier for the object itself and an identifier of a class or type of object, including an object identified as user movement.

In particular, by video processor 316, video processor 318, and sensor processor 319 identifying and classifying object properties, each of the processors may access behavior database 112 for accessing previously processed inputs and behavior mappings to more accurately identify and classify 2D object properties to detect and match the streamed 2D object properties to an object. In addition, geometry processor 320 may more accurately construct 3D properties of objects based on the streamed 2D object properties, based on previously matched and constructed 3D properties of objects accessed from behavior database 112. Further, object database 122 may store the streamed 2D object properties and 3D object properties for future reference.

In addition, by video processor 316, video processor 318, and sensor processor 319 identifying and classifying object properties and by geometry processor constructing 3D object properties 110, each of the processors may identify detected objects, including behaviors of monitored users. For example, video processor 316, video processors 318, sensor processor 319, and geometry processor 320 may access behavior database 112, which includes specifications for use in mapping facial expressions and other body movements, performing facial and other body movement recognition, and performing additional processing to identify an object representing a behavior. In addition, video processor 316, video processors 318, sensor processor 319, and geometry processor 320 may access behavior database 112, which includes specifications for different types of environments for use in identifying a particular environment in which a user is located based on detected objects and background. Further, in constructing 3D object properties 110, video processor 316, video processors 318, sensor processor 319, and geometry processor 320 may identify multiple detected objects in the environment and therefore identify multiple behaviors of a vehicle operator or one or more interactions between the vehicle operator and a passenger. By monitoring and identifying interactions between objects detected in the environment in which the object is located, more accurate prediction of a behavior of a vehicle operator and type of behavior may be performed.

Figure 4:
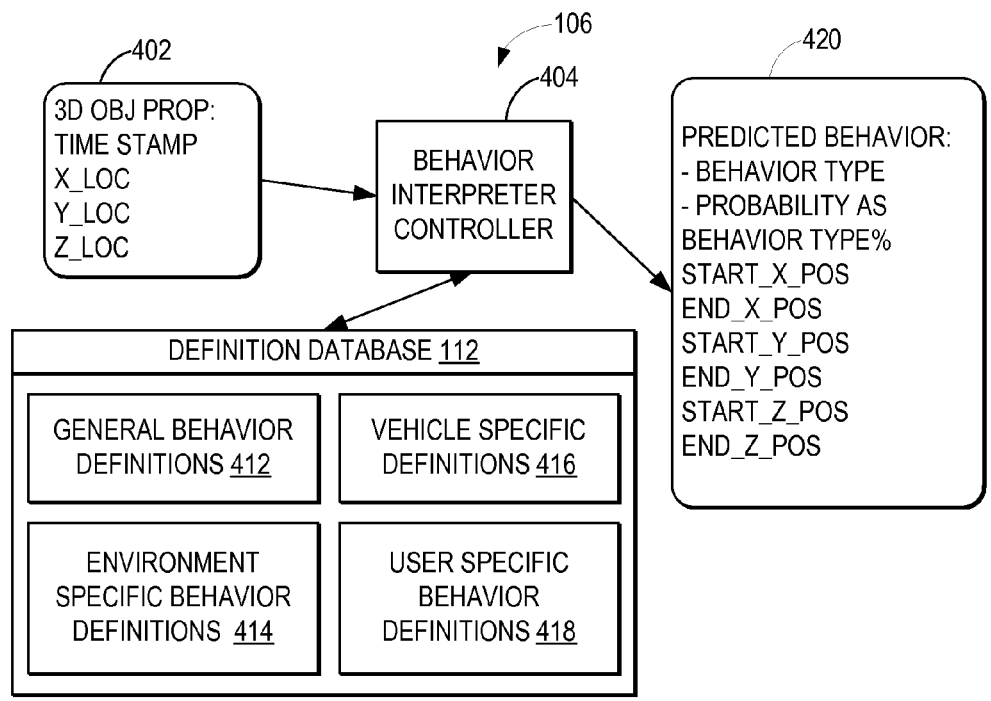
FIG. 4 is a block diagram depicting one embodiment of a behavior interpreter system.

Referring now to FIG. 4, a block diagram illustrates one embodiment of a behavior interpreter system. It is important to note that the multiple components depicted within behavior interpreter 106 may be incorporated within a single system or distributed via a network across multiple systems. In the example, a 3D properties record 402 includes "time stamp", "x_loc", "y_loc", and "z_loc" data elements. It will be understood that 3D properties record 402 may include additional or alternate data elements as determined by geometry processor 320 of FIG. 3. For example, 3D properties record 402 may include additional information identifying a particular or relative location of a an operator within a sensor area and not just within the focus area, colors, and other data collected by image capture devices and sensors and processed within 3D object detector 104.

Behavior interpreter 106 includes a behavior interpreter controller 404, where behavior interpreter controller 404 may include one or more processors programmed to perform behavior interpretation. For example, behavior interpreter controller 404 may include a processor with the CellBE architecture, programmed to efficiently process 3D object properties data streams, predict the behaviors of an operator of a vehicle from the 3D object properties data streams and predict a type of behavior. In addition, behavior interpreter controller 404 may include processors upon which software runs, where the software directs processing of 3D object properties streams, predicts the behaviors of an operator of a vehicle from the 3D object properties data streams and predicts a type of behavior.

In processing 3D object properties streams, predicting objects related to or representing the behavior of a vehicle operator, and predicting the types of behaviors of a vehicle operator, behavior interpreter controller 404 maps 3D object properties to one or more behavior definitions with a percentage probability that the streamed 3D object properties represent the mapped behavior definitions and with a percentage probability that the predicted behavior is correctly predicted. In particular, behavior interpreter controller 404 accesses one or more behavior definitions for one or more behaviors and determines whether the 3D object properties match one or more characteristics of one or more behaviors as defined in one or more of the behavior definitions. Behavior definitions may include mapped 3D models of one or more types of behaviors. In addition, behavior definitions may define the parameters of identifying characteristics of a behavior including, but not limited to, body part detected, type of movement, surface characteristics, shape, speed of movement, frequency, span of movement, depth of movement, temperature, and color.

In addition, in processing 3D object properties streams, behavior interpreter controller 404 maps 3D object properties to one or more item definitions related to predicting a behavior of an operator of a vehicle, where an item may include a fixed part of a vehicle or an item being carried within the vehicle. In one example, behavior definitions may include mapped 3D models for both behaviors and behaviors that are associated with an item, including a fixed part of a vehicle, such as a steering wheel, or an item being carried within the vehicle, such as food or a portable telephone.

It is important to note that in interpreting 3D object properties streams, behavior interpreter controller 404 performs an aggregate analysis of all the tracked objects in one or more 3D object properties streams identified for a particular focus area by one or more behavior processing systems. In one example, behavior interpreter controller 404 aggregates the 3D object property streams for a particular focus area and particular sensor area. In another example, behavior interpreter controller 404 may receive multiple 3D object properties streams from areas overlapping a focus area and sensor area, analyze the 3D object properties streams for similarities, location indicators, and orientation indicators, and construct the 3D object properties streams into a 3D aggregate representation of an area.

In one embodiment, behavior interpreter controller 404 may map the aggregate of the tracked objects directly into a single behavior definition. In another embodiment, behavior interpreter controller 404 maps multiple aggregated tracked objects into multiple behavior definitions. For example, a person may simultaneously perform a facial behavior and a hand behavior, where in predicting the actual behaviors communicated through the tracked movement of the facial behavior and hand behavior, behavior interpreter controller 404 analyzes the 3D object properties of the facial behavior in correlation with the 3D object properties of the hand behavior and accesses behavior definitions to enable prediction of each of the behaviors and to enable prediction of an overall behavior indicated the facial behavior and hand behavior in combination. Additionally, behavior interpreter controller 404 may aggregate the tracked objects representative of behavior by multiple people within an environment.

In particular, in predicting behaviors for output to an operating monitoring system, the behavior and item definitions within definition database 112 are specified to enable behavior interpreter controller 404 to focus on and distinguish those behaviors which potentially indicate unsafe behavior by an operator of a vehicle. In the example, definition database 112 includes general behavior definitions 412, environment specific behavior definitions 414, vehicle specific definitions 416, and user specific behavior definitions 418. It will be understood that definition database 112 may include additional or alternate types of behavior definitions and item definitions. In addition, it is important to note that each of the groupings of definitions illustrated in the example may reside in a single database or may be accessed from multiple database and data storage systems via a network. Further, it is important to note that each of the groupings of definitions within definitions database 112 residing at a particular system may be adjusted or updated responsive to changes in safety standards, new learned behaviors, and other factors.

General behavior definitions 412 include behavior definitions for common behaviors and factors for distinguishing between different degrees of common behaviors. For example, general behavior definitions 412 may include behavior definitions specifying a person shaking or nodding one's head to indicate lack of agreement or agreement. However, general behavior definitions 412 may also include behavior definitions distinguishing a person shaking or nodding one's head to indicate lack of agreement or agreement from other types of head shaking or nodding that indicate lack of attention, when coupled with other factors, such as a position of a person's eyes.

Environment specific behavior definitions 414 include behavior definitions and factors for determining a behavior that are specific to the context in which the behavior is being detected. Examples of contexts may include, but are not limited to, the current location of a vehicle, the time of day, the cultural meanings behind gestures and other behaviors within the context, the languages spoken within the context, and other factors that influence the context in which behavior could be interpreted. The current location of a vehicle may include the country or region in which the vehicle is located and may include the actual physical environment, such as a traffic light at an intersection, an open highway, or a parking lot. Behavior interpreter controller 404 may detect current context from accessing a GPS indicator of a vehicle's location, from performing speech analysis of the vehicle operator's speech to detect variations in language and dialect, from detecting items within the image data indicative of particular types of locations, or from receiving additional data from other systems monitoring the context of a vehicle's location.

Vehicle specific definitions 416 include behavior and item definitions specific to the vehicle which is being operated. In particular, vehicle specific definitions 416 include behavior definitions for behaviors which are specific to a person operating the vehicle and may distinguish between a first selection of behaviors which are indicative of a person safely operating a vehicle and a second selection of behaviors which are indicative of unsafe operation of a vehicle. In addition, vehicle specific definitions 416 may include item definitions for items which are fixed parts of a vehicle or which are commonly carried in the vehicle.

User specific behavior definitions 418 include behavior definitions specific to the current vehicle operator or a type of group to which the current vehicle operator is associated. In one example, behavior interpreter controller 404 accesses an identifier for a vehicle operator from the person presenting scannable identification, such as a license, the scanning of which provides an identifier for the vehicle operator to behavior interpreter controller 404. In another example, behavior interpreter controller 404 accesses an identifier for a vehicle operator from comparing an attribute of the user detected by 3D object detector 104, with a database of user attributes. For example, behavior interpreter controller 404 may perform facial or voice recognition. It will be understood that behavior interpreter controller 404 may perform other types of identity access and authentication of a vehicle operator for permitting a particular person to operate a vehicle and for more accurately predicting behaviors of that particular person from behavior definitions specified for that particular person in user specific behavior definitions 418.

It is important to note that by accessing behavior definitions specific to a particular user or group of users, behavior interpreter controller 404 may more efficiently and accurately distinguish between 3D object properties representing movement of a particular vehicle operator from 3D object properties not representative of movement by the operator. In particular, behavior interpreter controller 404 may access user behavior definitions that enable behavior interpreter controller 404 to map detected movement in 3D object properties to specific visual characteristics of an operator specified in a behavior definition for that operator.

In particular, user specific behavior definitions 418 may include behavior definitions classified by a level of experience of a current vehicle operator. For example, behavior definitions for a vehicle operator in training may specify behaviors more characteristic of unsafe behavior by a trainee and behavior definitions for an experienced vehicle operator may specify other behaviors more characteristic of unsafe behavior by an experienced vehicle operator.

In addition, within the available behavior definitions, a behavior definition may include specifications for detecting a behavior that is all or partially obscured by an obstruction. For example, a behavior definition may enable prediction of an underlying eye movement behavior distorted or inhibited by a vehicle operator wearing prescription glasses or sunglasses, based on the characteristics of the glasses and other detectable movements, such as eyebrow and forehead movements, skin wrinkling around the eyes, and the position of an operator's head.

Further, within the available behavior definitions, a behavior definition may be associated with a particular area of movement or a particular depth of movement within a 3D focus area. In particular, the three-dimensional focus area in which movement is detected may be divided into three-dimensional portions, where movements made in each of the portions may be interpreted under different selections of behavior definitions. For example, one three-dimensional portion of a focus area may be considered an "active region" where movement detected within the area is compared with a selection of behavior definitions associated with that particular active region, such as a region within a particular distance of a security point.

Behavior interpreter controller 404 may output predicted behavior output 108 in the form of one or more behavior records, such as behavior record 420. Behavior record 420 indicates the "behavior type" and "probability %" as the behavior". In addition, behavior record 420 includes the start X, Y, and Z axis properties and ending X, Y, and Z axis properties of the detected behavior, indicative of the location, direction of movement, and speed of movement of the behavior, listed as "start_x_pos", "end_x_pos", "start_y_pos", "end_y_pos", "start_z_pos", "end_z_pos". Although not depicted, behavior record 420 may also indicate the X, Y, and Z axis start and ending properties of monitored vehicle operator movement, indicative of the location, direction of movement, and speed of movement of the monitored vehicle operator. Further, additional information acquired from sensors, such as RFID data, GPS coordinates, skin surface characteristics, and other sensed data, may be associated with a particular behavior record or included in a separate object record.

In passing behavior record 420, behavior interpreter controller 404 may filter out particular types of behavior records. For example, behavior interpreter controller 404 may not pass records where the predicted probability of a behavior is less than a particular percentage.

Figure 5:
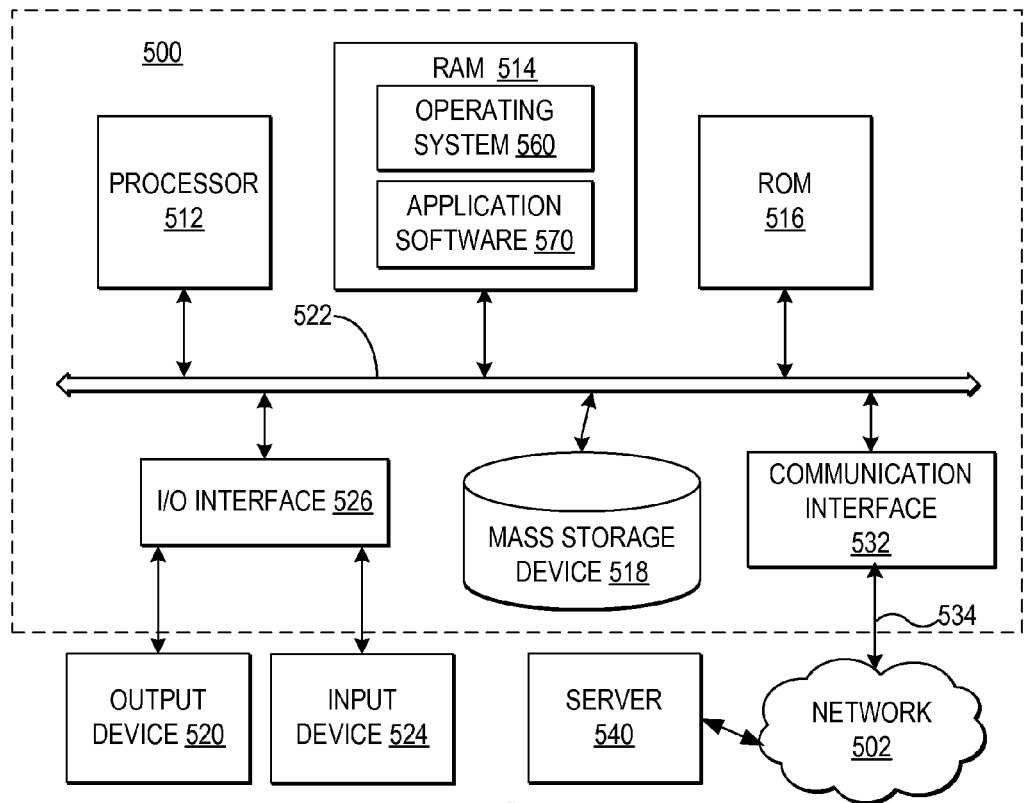
FIG. 5 is a block diagram illustrating one embodiment of a computing system in which the present invention may be implemented.

With reference now to FIG. 5, a block diagram depicts one embodiment of a computing system in which the present invention may be implemented. The controllers and systems of the present invention may be executed in a variety of systems, including a variety of computing systems, such as computer system 500, communicatively connected to a network, such as network 502.

Computer system 500 includes a bus 522 or other communication device for communicating information within computer system 500, and at least one processing device such as processor 512, coupled to bus 522 for processing information. Bus 522 preferably includes low-latency and higher latency paths that are connected by bridges and adapters and controlled within computer system 500 by multiple bus controllers. When implemented as a server, computer system 500 may include multiple processors designed to improve network servicing power. Where multiple processors share bus 522, an additional controller (not depicted) for managing bus access and locks may be implemented.

Processor 512 may be a general-purpose processor such as IBM's PowerPC™ processor that, during normal operation, processes data under the control of an operating system 560, application software 570, middleware (not depicted), and other code accessible from a dynamic storage device such as random access memory (RAM) 514, a static storage device such as Read Only Memory (ROM) 516, a data storage device, such as mass storage device 518, or other data storage medium. In one example, processor 512 may further implement the CellBE architecture to more efficiently process complex streams of data in 3D. It will be understood that processor 512 may implement other types of processor architectures. In addition, it is important to note that processor 512 may represent multiple processor chips connected locally or through a network and enabled to efficiently distribute processing tasks.

In one embodiment, the operations performed by processor 512 may control 3D behavior detection and prediction from captured images and data within a vehicle prediction whether the predicted behavior represents unsafe behavior for the current operational state of a vehicle, and output of control signals indicating the unsafe behavior depicted in the operations of flowcharts of FIGS. 10-13 and other operations described herein. Operations performed by processor 512 may be requested by operating system 560, application software 570, middleware or other code or the steps of the present invention might be performed by specific hardware components that contain hardwired logic for performing the steps, or by any combination of programmed computer components and custom hardware components.

The present invention may be provided as a computer program product, included on a computer or machine-readable medium having stored thereon the executable instructions of a computer-readable program that when executed on computer system 500 cause computer system 500 to perform a process according to the present invention. The terms "computer-readable medium" or "machine-readable medium" as used herein includes any medium that participates in providing instructions to processor 512 or other components of computer system 500 for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 500 can read and which is suitable for storing instructions. In the present embodiment, an example of a non-volatile medium is mass storage device 518 which as depicted is an internal component of computer system 500, but will be understood to also be provided by an external device. Volatile media include dynamic memory such as RAM 514. Transmission media include coaxial cables, copper wire or fiber optics, including the wires that comprise bus 522. Transmission media can also take the form of acoustic or light waves, such as those generated during radio frequency or infrared data communications.

Moreover, the present invention may be downloaded or distributed as a computer program product, wherein the computer-readable program instructions may be transmitted from a remote computer such as a server 540 to requesting computer system 500 by way of data signals embodied in a carrier wave or other propagation medium via network 502 to a network link 534 (e.g. a modem or network connection) to a communications interface 532 coupled to bus 522. In one example, where processor 512 includes multiple processor elements, then a processing task distributed among the processor elements, whether locally or via a network, may represent a computer program product, where the processing task includes program instructions for performing a process or program instructions for accessing Java (Java is a registered trademark of Sun Microsystems, Inc.) objects or other executables for performing a process. Communications interface 532 provides a two-way data communications coupling to network link 534 that may be connected, for example, to a local area network (LAN), wide area network (WAN), or directly to an Internet Service Provider (ISP). In particular, network link 534 may provide wired and/or wireless network communications to one or more networks, such as network 502. Further, although not depicted, communication interface 532 may include software, such as device drivers, hardware, such as adapters, and other controllers that enable communication. When implemented as a server, computer system 500 may include multiple communication interfaces accessible via multiple peripheral component interconnect (PCI) bus bridges connected to an input/output controller, for example. In this manner, computer system 500 allows connections to multiple clients via multiple separate ports and each port may also support multiple connections to multiple clients.

Network link 534 and network 502 both use electrical, electromagnetic, or optical signals that carry digital data streams. The signals through the various networks and the signals on network link 534 and through communication interface 532, which carry the digital data to and from computer system 500, may be forms of carrier waves transporting the information.

In addition, computer system 500 may include multiple peripheral components that facilitate input and output. These peripheral components are connected to multiple controllers, adapters, and expansion slots, such as input/output (I/O) interface 526, coupled to one of the multiple levels of bus 522. For example, input device 524 may include, for example, a microphone, a video capture device, a body scanning system, a keyboard, a mouse, or other input peripheral device, communicatively enabled on bus 522 via I/O interface 526 controlling inputs. In addition, for example, an output device 520 communicatively enabled on bus 522 via I/O interface 526 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 5 may vary. Furthermore, those of ordinary skill in the art will appreciate that the depicted example is not meant to imply architectural limitations with respect to the present invention.

Figure 6:
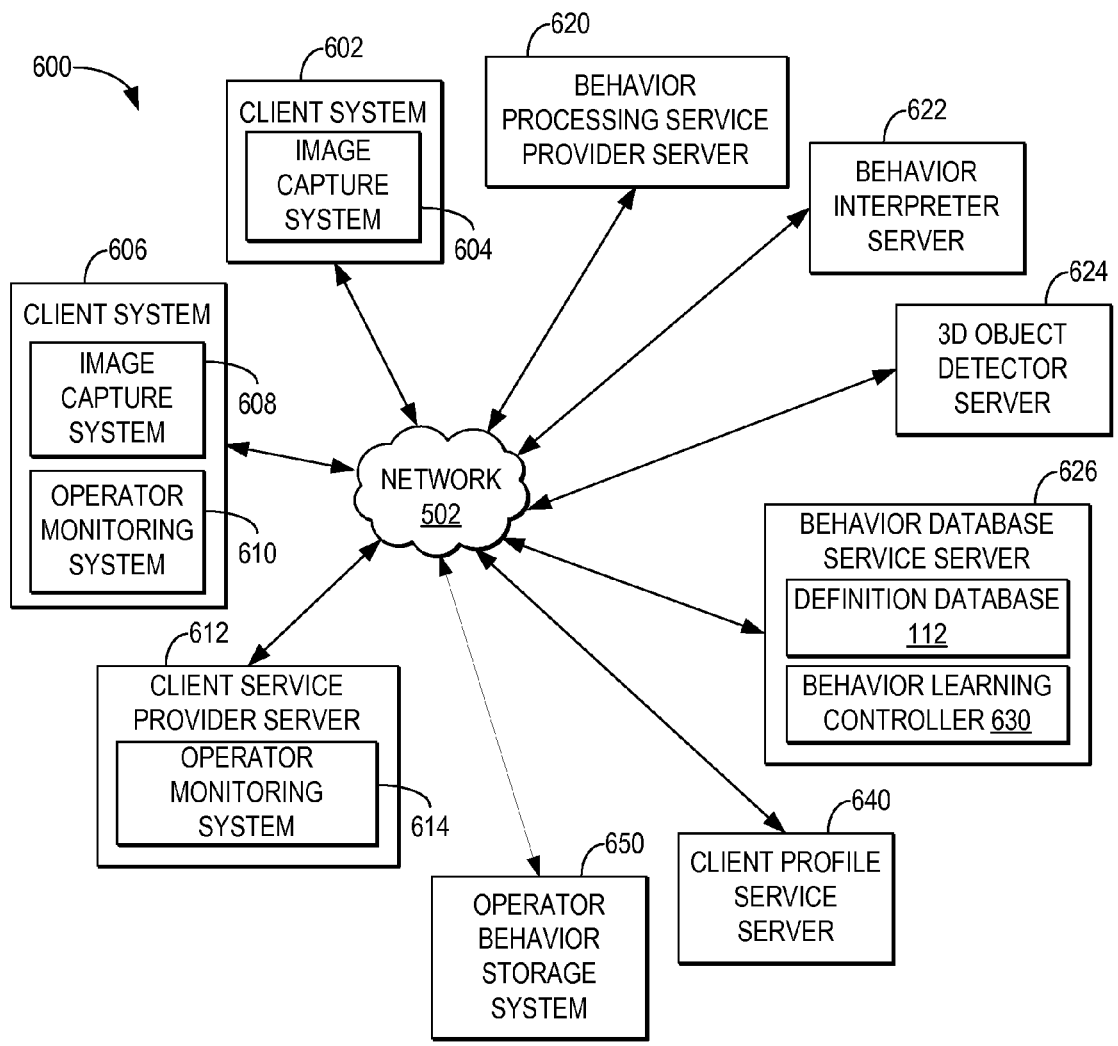
FIG. 6 is a block diagram depicting one example of a distributed network environment in which a behavior-enabled operator monitoring method, system, and program product may be implemented.

Referring now to FIG. 6, a block diagram depicts one example of a distributed network environment in which a behavior-enabled operator monitoring method, system, and program product may be implemented. It is important to note that distributed network environment 600 is illustrative of one type of network environment in which the behavior-enabled operator monitoring method, system, and program product may be implemented, however, the behavior-enabled operating monitoring method, system, and program product may be implemented in other network environments. In addition, it is important to note that the distribution of systems within distributed network environment 600 is illustrative of a distribution of systems; however, other distributions of systems within a network environment may be implemented. Further, it is important to note that, in the example, the systems depicted are representative of the types of systems and services that may be accessed or request access in implementing a behavior processing system and a behavior-enabled operator monitoring system. It will be understood that other types of systems and services and other groupings of systems and services in a network environment may implement the behavior processing system and behavior-enabled operator monitoring system.

As illustrated, multiple systems within distributed network environment 600 may be communicatively connected via network 502, which is the medium used to provide communications links between various devices and computer communicatively connected. Network 502 may include permanent connections such as wire or fiber optics cables and temporary connections made through telephone connections and wireless transmission connections, for example. Network 502 may represent both packet-switching based and telephony based networks, local area and wide area networks, public and private networks. It will be understood that FIG. 6 is representative of one example of a distributed communication network for supporting a behavior processing system and behavior-enabled operator monitoring system; however other network configurations and network components may be implemented.

The network environment depicted in FIG. 6 may implement multiple types of network architectures. In one example, the network environment may be implemented using a client/server architecture, where computing systems requesting data or processes are referred to as clients and computing systems processing data requests and processes are referred to as servers. It will be understood that a client system may perform as both a client and server and a server system may perform as both a client and a server, within a client/server architecture. In addition, it will be understood that other types of network architectures and combinations of network architectures may be implemented.

In the example, distributed network environment 600 includes a client system 602 with an image capture system 604 and a client system 606 with an image capture system 608. In one example, image capture systems 604 and 608 function as a stereoscopic image device implementing one or more image capture devices, such as image capture devices 202 and 204, and may include one or more sensors, such as sensor 240. Image capture systems 604 and 608 capture images and other data and stream the images and other data to other systems via network 502 for processing. In addition, image capture systems 604 and 608 may include video processors for tracking object properties, such as video processor 316 and video processor 318, described with reference to FIG. 3 and a geometry processor for generating streams of 3D object properties, such as geometry processor 320, described with reference to FIG. 3.

In one example, each of client system 602 and client system 606 may stream captured image frames to one or more behavior detection services. In one example, an behavior processing service provider server 620 provides a service that includes both an object detector service, such as 3D object detector 104, for processing streamed images and other data and an behavior interpreter service, such as behavior interpreter 106, for predicting types of behaviors by a vehicle operator, predicting a probability that the captured images represent the predicted type of behavior, and controlling output of the predicted behavior records to one or more other systems accessible via network 502.

As to behavior processing service provider server 620, different entities may implement a behavior processing service and different entities may access the behavior processing service. In one example, a user logged into one of client system 602 or client system 606 may subscribe to the behavior processing service. In another example, either of client system 602 or client system 606 may represent a vehicle computer system which transmits captured images and other data to behavior processing service provider server 620 for processing and behavior prediction. In another example, an image capture system or a particular application requesting behavior processing may automatically stream captured images and data to the behavior processing service.

In another example, each of client system 602 and client system 606 may stream captured frames to a 3D object detector server 624. 3D object detector server 624 receives captured images and other data from image capture systems, such as image capture system 604 or image capture system 608, and processes the images and other data to generate 3D object properties of detected behaviors, for output to a behavior interpreter system, such as behavior interpreter server 622 or behavior processing service provider server 620. In additional or alternate embodiments, an object detector service may be implemented within one or more other systems, with one or more other services performed within those systems. In particular, in additional or alternate embodiments, an object detector service may be implemented within a client system at which the images and other data are captured.

Each of the server system described may be distributed across one or more systems. In addition, each of the server systems may be distributed across systems with 3D image processing power, including processors with the CellBE architecture programmed to perform efficient 3D data processing. In one example, an entity, such as a business or service provider, may implement separate server systems for object detection and behavior interpretation, wherein multiple behavior interpreter servers are implemented with each behavior interpreter server processing different types of 3D object properties.

Behavior processing service provider server 620, behavior interpreter server 622, and 3D object detector server 624 may locally store a definition database, such as definition database 112, of raw images, 3D behavior properties, behavior definitions, and item definitions. In addition, behavior processing service provider server 620, behavior interpreter server 622 and 3D object detector server 624 may access a behavior database service server 626 that facilitates definition database 112.

In addition, behavior database service server 626 includes a behavior learning controller 630. Behavior learning controller 630 prompts users, such as a vehicle operator, to provide samples of particular types of behaviors and prompts users to indicate whether a predicted type of behavior matches the user's actual behavior. In addition, behavior learning controller 630 gathers other information that enables behavior learning controller 630 to learn and maintain behavior information in behavior database 112 that when accessed by behavior object detector services and behavior interpreter services, increases the accuracy of generation of 3D object properties and accuracy of prediction of behaviors and the potentially adversity of behaviors from 3D object properties by these services.

Further, behavior processing service provider server 620, behavior interpreter server 622, 3D object detector server 624, or behavior database service server 626 may access additional context information for a vehicle operator, including behavior definitions specified for a particular vehicle operator, previous unsafe behavior by the vehicle operator, and other data about the vehicle operator from a client profile service server 640. In addition, client profile service server 640 may monitor and provide additional information about a location of a vehicle from monitored information such as the current location of the vehicle operator, the current physical environment in which the vehicle operator is located, the events currently scheduled for a vehicle operator. In one example, client profile service provider 640 monitors a vehicle operator's electronic calendar or a vehicle operator's current GPS location, for example, from the vehicle operator's personal, portable telephony device.

Behavior processing service provider server 620 and behavior interpreter server 622 stream predicted behavior records, such as behavior records 420, to behavior-enabled operator monitoring systems via network 502. In the example embodiment, client system 606, such as an onboard vehicle computer system, includes a behavior-enabled operator monitoring system 610, enabling client system 606 to determine whether received predicted behavior records for a vehicle operator indicate unsafe behavior in view of the current operational state of the vehicle and to generate and control output of signals if a behavior is indicated as unsafe.

In addition, in the example embodiment, client service provider server 612 includes a behavior-enabled operator monitoring system 614 which is a behavior-enabled service for enabling client service provider server 612 to determine whether received predicted behavior records for a vehicle operator of a vehicle subscribed to the service indicate unsafe behavior in view of the current operational state of the vehicle and to generate signals for transmission to the vehicle and output at the vehicle. In particular, client service provider server 612 represents a server which provides an operator monitoring service to one or more subscribing client systems onboard vehicles or at other locations.

As will be further described with reference to FIG. 7, operator monitoring systems, such as operator monitoring system 610 or operator monitoring system 614, may control storage of predicted behavior records and whether predicted behavior records indicate potentially unsafe behavior by a vehicle operator for a current operational state of a vehicle. In addition, operator monitoring systems may tag particular behavior records when an accident occurs, such as through detecting one of the parts of the vehicle stop functioning, detecting airbags deploy, or detecting indicators from an operator's behavior that there has been an accident. In one example, operator monitoring system 610 or operator monitoring system 614 may control storage of predicted behavior records at a separate operator behavior storage system 650 or at client profile service server 640 accessible via network 502.

Returning to behavior learning controller 630, behavior learning controller 630 may also monitor operator monitoring system 610, operator monitoring system 614, or operator behavior storage system 650 to learn which behaviors were predicted as indicating unsafe behavior and correlated with an accident still occurring and which behaviors were not predicted as indicating unsafe behavior, but correlated with an accident, such that behavior learning controller 630 learns the types of behaviors that lead to accidents and may identify additional behaviors occurring prior to behaviors that lead to accidents. Behavior learning controller 630 may also detect patterns of behavior by a particular vehicle operator or multiple vehicle operators of a particular type of vehicle. In addition, it will be understood that behavior learning controller 630 may learn additional behavior definitions and gather additional types of statistics from predicted behavior records, unsafe behavior predicts, and accident records accessed from multiple operator monitoring systems and operator behavior storage systems, for example.

Figure 7:
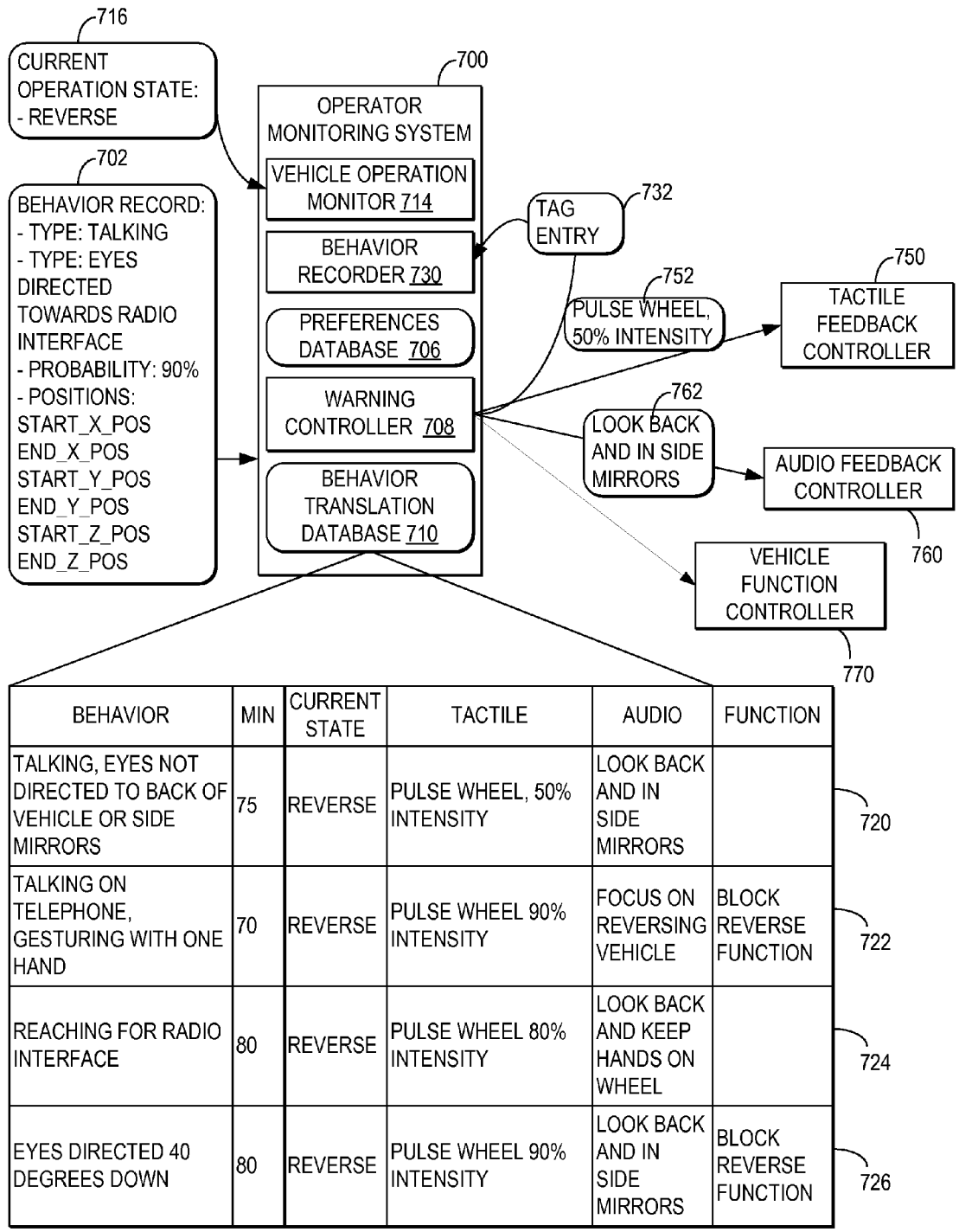
FIG. 7 is a block diagram illustrating one example of an implementation of a behavior interpreter system for identifying behaviors of a vehicle operator from which a behavior-enabled operator monitoring system determines whether the behavior indicates unsafe behavior by the vehicle operator for the current operational state of the vehicle.

With reference now to FIG. 7, a block diagram illustrates one example of an implementation of a behavior interpreter system for identifying behaviors of a vehicle operator from which a behavior-enabled operator monitoring system determines whether the behavior indicates unsafe behavior by the vehicle operator for the current operational state of the vehicle. Operator monitoring system 700 receives predicted behavior records from behavior processing system 100, from which operator monitoring system 700 determines whether the behavior is unsafe and controls output of at least one warning signal for based on real-time, 3D images and other data captured of a vehicle operator. In particular, according to an advantage, operator monitoring system 700 may control warning signals to one or more output interface within a vehicle or may send control signals for controlling one or more function of a vehicle, responsive to detecting unsafe behavior by a vehicle operator based on a captured 3D image stream.

In particular, warning controller 708 of operator monitoring system 700 may base warning instructions on behavior records, such as behavior record 702. In addition, warning controller 708 may enhance or generate warning instructions based on other data, combined with the data included in behavior record 702. For example, warning controller 708 may access static or dynamic information about environment in which a vehicle operates, through accessing structural maps, photographs, video streams, RFID information, and other data accessible from the monitored environment. Then, warning controller 708 may generate a mapping of the environment in which a vehicle is operating and may map the predicted behavior records at locations within the monitored environment. In addition, warning controller 708 may detect, from the mapping, potential obstacles or other conditions which effect vehicle safety.

In addition, operator monitoring system 700 includes or accesses data from a vehicle operation monitor 714. Vehicle operation monitor 714 detects a current operational state of a vehicle. For purposes of illustration, in the example, a record 716 includes indicates a current operational state of "reverse". Other examples of types of operational states of a vehicle may include, but are not limited to, a speed of travel, a gear engaged, a position of a steering wheel, whether any safety features such as airbags are deployed, actuation of an antilock braking system, whether a radio, onboard DVD or navigation system is active, and a seat belt tension.

For purposes of illustration, in the example, operator monitoring system 700 receives behavior record 702 and warning controller 708 translates behavior record 702 into warning signals illustrated at reference numerals 752 and 762 and an additional control signal illustrated at reference numeral 732. In the embodiment depicted, in translating behavior record 702, warning controller 708 accesses behavior translation database 710 to translate a type of behavior, a percentage probability of the type of behavior, and the current operational state of a vehicle, into warning instructions or other control signals based on the type of device to which the warning instructions will be output. In other embodiments, behavior records may be translated into other types of data usable by warning controller 708 for implementing a warning system. A user preferences database 706 may specify preferences as to the type of device to which the warning instructions will be output and additional filtering preferences for use in filtering behavior translation database 710. In addition, behavior translation database 710 may be associated with a particular vehicle, a particular type of vehicle, or a particular operator, or behavior translation database 710 may be selected according to other criteria.

In the example, adverse behavior translation database 710 includes, for each entry, data specified in multiple categories. In particular, in the example, each entry includes a behavior type and a minimum (min) percentage probability that the behavior type is correctly predicted, and a current operational state of the vehicle require to trigger one or more of the instructions for generating warning signals and other control signals. In the example, instructions may trigger generating a tactile detectable warning signal for output to a tactile feedback controller 750, an audio warning signal for output to an audio feedback controller 760, and a control command for controlling the function of a vehicle for output to a vehicle function controller 770.

In particular, in the example, behavior record 702 includes aggregated behaviors of "talking" and "eyes directed towards radio interface" with a probability of 90% that the behaviors are accurately predicted. It is important to note that the examples of data included in predicted behavior record 702 are illustrative of, but not limiting of, the types of data and the detail of data that may be included in behavior records output by behavior processing system 100 and received by operator monitoring system 700.

In the example, warning controller 708 may generate and output warning instructions and other control signals to one or more of the devices illustrated. For the example, warning controller 708 compares behavior record 702 and current operational state record 716 with behavior translation database 710 and determines that entry 720 applies to behavior record 702 and current operational state record 716. Because the behaviors in behavior record 702 correlate with a current operational state in behavior translation database 710, warning controller 708 considers the behavior to be unsafe for the current operational state of the vehicle and determines output signals to warn the current vehicle operator of the lack of safety being exercised.

Based on the application of entry 720, in the example, warning controller 708 may generate a warning signal 752 of "pulse wheel, 50% intensity" and output warning signal 752 to tactile feedback controller 750. Tactile feedback controller 750 controls at least one tactile feedback device on a steering when of the vehicle, where the tactile feedback device controls a tactile detectable output, such as a tactile detectable pulse, along the steering wheel. Warning controller 708, in the example, specifies an intensity level of the tactile output. In addition, warning controller 708 may specify other attributes including, but not limited to, position, frequency, pattern, and duration. By signaling an operator to an unsafe behavior through tactile feedback, an operator who may not hear a warning, will feel the warning. In addition, a tactile feedback warning may trigger operator alertness.

In addition, based on the application of entry 720, in the example, warning controller 708 may generate a warning signal 754 of "look back and in side mirrors" for output as an audible warning to the vehicle operator by audio feedback controller 760. In one example, warning controller 708 may trigger pre-recorded audio messages. In another example, warning controller 708 or audio feedback controller 760 may translate text into an audio message. In addition to or as an alternate to an audio message, warning controller 708 may also trigger video messages or graphical messages for output via a display interface viewable by an operator.

Entry 724 provides an example of a behavior processing system predicting a behavior based on a 3D image stream. In particular, from a 3D image stream, where multiple interfaces are accessible to an operator within a close proximity, a 2D image stream may not capture a depth of the operator's arm to enable detection of which interface the operator is reaching for.

Further, although not triggered by entry 720, warning controller 708 may generate a control signal for output to vehicle function controller 770, where vehicle function controller 770 may block certain functions of a vehicle, such as a radio system, integrated phone system, entertainment system, or accelerator, or apply a function, such as a brake. In addition, vehicle function controller 770 may send alerts signals to a communication system that transmits the communication in real-time to a person or stores the alert signal for generating a record of operator behavior. For example, vehicle function controller 770 may send an alert signal to a communication system that transmits the alert signal to the owner of a vehicle.

In the illustrative examples of vehicle control signals depicted in FIG. 7, entry 722 specifies that for a behavior of "talking on telephone" and "gesturing with one hand", with a minimum probability of 70%, and an operational state of "reverse", a control signal should be generated to "block the reverse function. Similarly, in entry 726, for a behavior of "eyes directed 40 degrees down" with a minimum probability of 80%, and an operational state of "reverse", a control signal should also be generated to "block the reverse function." In another example, warning controller 708 may generate a control signal for output to vehicle function controller 770 after a number of times an operator performs a same unsafe behavior reaches a threshold number of times over a particular period of time.

It is important to note that regardless of whether warning controller 708 automatically generates a warning signal or automatically generates a signal for controlling a function of a vehicle, for each automated signal, a more accurate prediction of a behavior ensure that an automated signal is responsive to actual behaviors of an operator. In particular, both the granularity of a 3D captured image stream and the specificity of a behavior definition effect accuracy at which behaviors are predicted, and therefore effect the accuracy with which warning controller 708 automates warning and control functions. The quality of a 3D captured image stream and the specificity of a behavior definition may also effect the determination by behavior processing system of whether the operator intends to behave in the manner captured or is involuntarily behaving in a particular manner.

In the embodiment, operator monitoring system 700 includes a behavior recorder 730 for recording each behavior record with an associated operational state and for recording each warning signal or other control signal generated by warning controller 708. In the example, warning controller 708 may also trigger behavior recorder 730 to tag a current behavior entry, such as through a tag entry command 732. In one example, behavior translation database 710 may include a setting for determining whether to generate an instruction to tag an entry. In another example, preferences database 706 may include preferences for particular types of behavior records and warning signals to tag. Additionally, warning controller may automatically tag entries received for one or more specified operational states.

By recording behavior records and warning signals, behavior recorder 730 records a record of the behaviors and movements of a vehicle operator. For example, many planes include a black box that records the voice transmissions and control signals issued during a flight. In the present embodiment, behavior recorder 730 provides a recording of control signals that indicate the vehicle operation in correlation with records of behaviors of a vehicle operator. An insurance company, for example, may provide a benefit to a consumer whose vehicle includes behavior recorder 730 because the insurance company would be provided with a record of behaviors in the event the vehicle is in an accident and drivers would have a greater incentive to operate a vehicle safely.

In addition, in the example, by tagging particular entries within behavior recorder 730, the entries recorded by behavior recorder 730 may be more quickly sorted through in the event that an accident occurs. Additionally, by tagging particular entries, warning controller 708 may authorize behavior recorder 730 to distribute tagged entries to a behavior learning controller or other service that collects behavior entries and generates behavioral statistics.

With reference now to FIG. 8, a block diagram illustrates one example of a behavior processing system implemented within a vehicle for identifying behaviors of an operator from captured 3D image streams and an operator monitoring system for controlling warnings and other control signals for the vehicle based on the predicted behaviors.

In the example, an environment 800 for a vehicle includes a stereoscopic image device implemented using image capture device 202 and image capture device affixed to a rearview mirror 804 or other position within the front of a vehicle. Image capture device 202 and image capture device 204 capture image streams of an area 802 to enable behavior processing system 100 to generate a 3D captured image stream and to predicted behaviors of an operator 808 from the 3D captured image stream. It will be understood that in other embodiments, a stereoscopic image device may be implemented through other image capture devices and sensors, in other locations, and may be implemented through a single image capture device enabled to extract depth across multiple frames.

In one example, the captured images enable behavior processing system 100 to determine a 3D angle of a head of operator 808 relative to a 3D position established as normal, such as the head of operator 808 facing straight forward to the front windshield, untilted. In addition, the captured images enable behavior processing system 100 to determine a 3D position of the eyes of operator 808 relative to a particular 3D position established as normal.

By detecting a 3D position of a head and eyes, behavior processing system 100 may detect whether operator 808 is looking at a particular object outside vehicle. For example, behavior processing system 100, having a mapping of the position of side mirror 806, may detect from captured 3D images, whether a head and eye position of operator 808 indicates operator 808 is looking at an image within side mirror 806.

In addition, by detecting a 3D position of head and eyes, behavior processing system 100 may detect whether operator 808 is looking at a specific part of the interior of the vehicle, at a particular item carried within the vehicle, or at another passenger in the vehicle. For example, behavior processing system, having a mapping of the positions of interfaces within the vehicle, may detected from captured 3D images, whether a head and eye position of operator 808 indicates operator 808 is looking at radio interface 814. In another example, behavior processing system, having detected a passenger within area 802, may detect from captured 3D images, whether a head and eye position of operator 808 indicates operator 808 is looking at the passenger.

Further, the captured images enable behavior processing system 100 to determine a 3D position of an arm of operator 808 reaching for a navigation interface 812, a radio interface 814, gear selector 816 or other interfaces, knobs, and levers within a vehicle. Other behavior movements behavior processing system 100 may determine from the captured images, for example, include a relative position of operator 808 in relation to a seat and a relative position of a seat in relation to steering wheel 810. Further, behavior processing system 100 may monitor a position of an operator's shoulders from 3D captured images.

In the example, environment 800 of a vehicle includes behavior processing system 100 and operator monitoring system 700. It will be understood that behavior processing system and operator monitoring system 700 may each be positioned within environment 800 or may be accessed via a wireless network connection.

Operator monitoring system 700, upon receipt of a behavior record for a behavior of operator 808 from behavior processing system 700, determines whether to generate and control output of a warning signal or other control signal. In the example, operator monitoring system 700 may control output of a warning signal, for example, via the tactile detectable interface of steering wheel 810. As previously described, control signals may be sent to a tactile feedback controller for steering wheel 810 to control tactile detectable outputs at points throughout the surface of steering wheel 810. In another example, although not detected, the operator may wear a tactile feedback device, such as a tactile feedback wristband, and operator monitoring system 700 may control output of a tactile feedback signal to the tactile feedback devices worn by an operator.

In addition, operator monitoring system 700 may control output of audio warning signals through an interface enabled to control output through one or more speakers or other audio output devices within the vehicle or worn by operator 808. In the example, operator monitoring system 700 may control output of audio warning signals through control signals to the controller for navigation interface 812 or radio interface 814.

Further, operator monitoring system 700 may control output of a control signal to one or more vehicle function controllers within a vehicle (not depicted). For example, if operator 808 continues to be distracted by radio interface 814, there may be a condition that triggers operator monitoring system 700 to send a control signal to the controller for radio interface 814 to disable radio interface 814. In another example, if operator 808 enters the vehicle and the operator's behavior indicates a level of impairment exceeding a particular threshold or operator 808 is not sitting in a required position to begin driving the vehicle, operator monitoring system 700 may send a control signal to a controller for gear selector 816 to lock gear selector 816 into an idle position. In yet another example, operator 808 may be wearing a seat restraint, where operator monitoring system 700, upon detection of a particular behavior operator monitoring system 700 may send a control signal to a control system to tighten the tension of the seatbelt.

Figure 9:
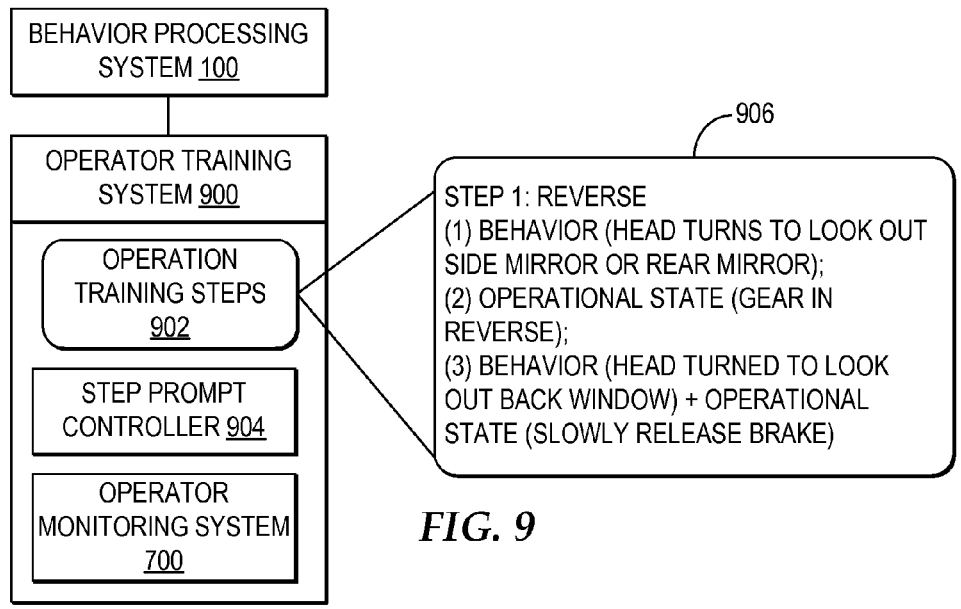
FIG. 9 is an illustrative diagram illustrating a behavior-enabled operator training system.

With reference now to FIG. 9, a block diagram illustrates a behavior-enabled operator training system. In the example, in addition to monitoring operator behavior and generating warning or other control signals within the vehicle, operator monitoring system 700 may be incorporated within other systems, such as a behavior-enabled operator training system 900. In the example, a step prompt controller 904 prompts an operator to perform a particular step from operation training steps 902 and monitors whether the operator completed the step based on operator behavior and the current operational state of the vehicle. In the example, operator training steps 902 includes multiple steps, such the step illustrated at reference numeral 906, for output to an operator via one or more interfaces accessible within a vehicle, such as an audio output interface or graphical output interface.

Operator training system 900 receives predicted behaviors of the operator from behavior processing system 100 and determines, for the operation training step whether the behaviors matched an expected behavior and whether the operational state matches an expected operational state. If a behavior and operational state match the expected behavior and operational state, the step includes instructions for generating an output signal for indicating compliance. In addition, a record of the training session may include the behavior and operational state entries for indicating compliance.

When operator training system 900 receives a behavior and operational state and there is not a match for the step, operator training system 900 determines whether a warning signal should be output to the operator with instructions to adjust behavior. As previously described with reference to FIG. 7, operator training system 900 may include behavior translation database 710, where a current behavior and operational state trigger a warning or other control signal. Behavior translation database 710 may specify warning instructions and other control signals based on a level of training of a current operator to ensure the safety of the operator during training.

Figures 10, 11:
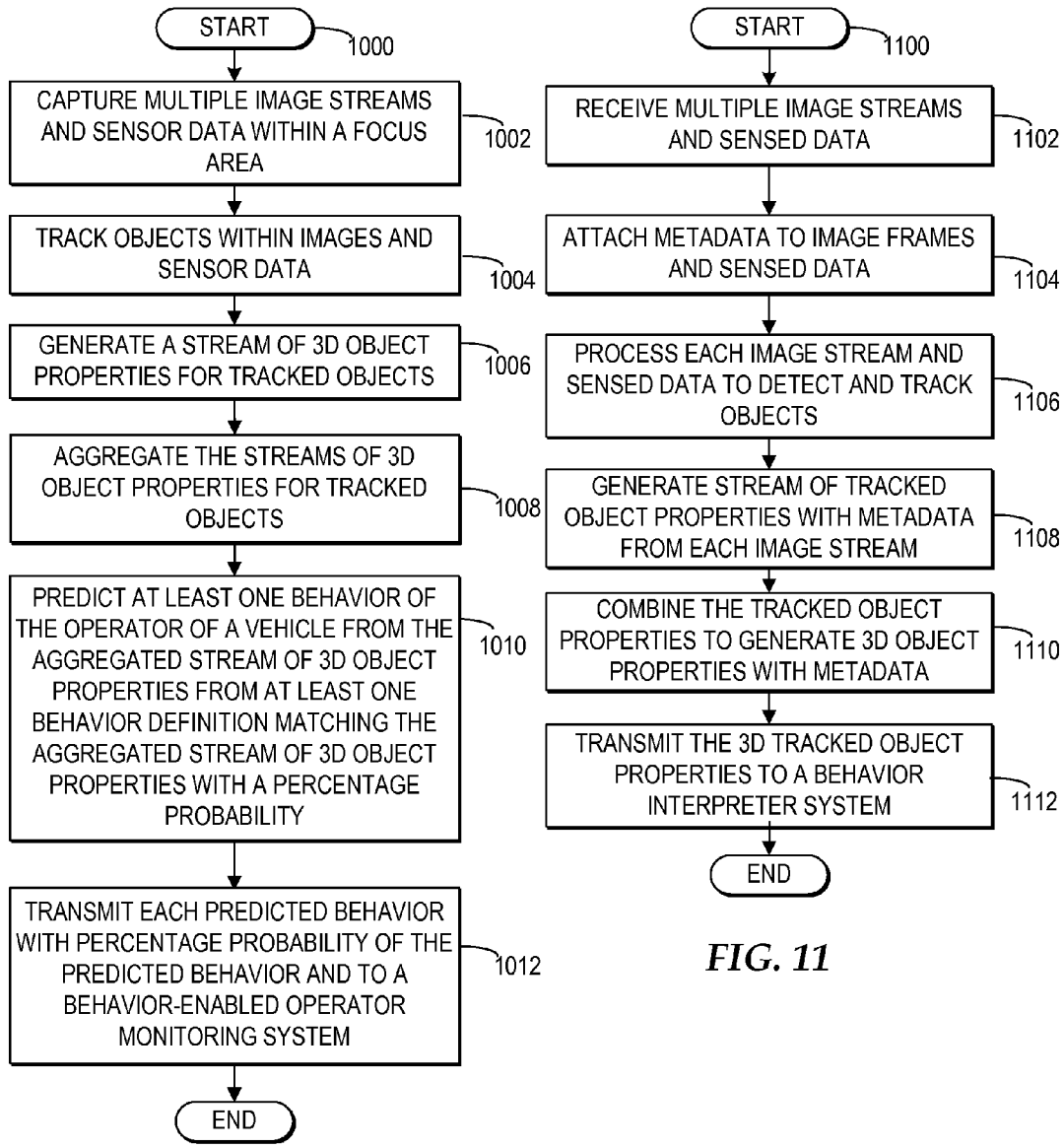
FIG. 10 is a high level logic flowchart depicting a process and program for a behavior processing system to identify object types and paths with a percentage probability.
FIG. 11 is a high level logic flowchart illustrating a process and program for a 3D object detector of a behavior processing system enabling behavior detection by tracking objects within image streams and other sensed data and generating 3D object properties for the tracked objects representative of behaviors.

Referring now to FIG. 10, a high level logic flowchart depicts a process and program for a behavior processing system to identify predicted object types and paths with a percentage probability. In the example, the process starts at block 1000, and thereafter proceeds to block 1002. Block 1002 depicts capturing, via a stereoscopic image device, multiple image streams and via sensors, sensor data, within a focus area. Next, block 1004 illustrates tracking objects within the images and sensor data. Thereafter, block 1006 depicts generating a stream of 3D object properties for tracked objects. Thereafter, block 1008 depicts aggregating the 3D object properties for each of the tracked objects. In particular, the aggregated 3D object properties represent one or more objects tracked in association with behaviors of at least the operator of a vehicle. Next, block 1010 illustrates predicting at least one type of behavior of the operator of a vehicle from the aggregated stream of 3D object properties from one or more behavior definitions that match the aggregated stream of 3D object properties with a percentage of probability. Thereafter, block 1012 depicts transmitting each predicted type of behavior and percentage probability in behavior records to a behavior-enabled operator monitoring system and the process ends.

With reference now to FIG. 11, a high level logic flowchart depicts a process and program for a 3D object detector of a behavior processing system enabling behavior detection by tracking objects within image streams and other sensed data and generating 3D object properties for the tracked objects representative of behaviors. As illustrated, the process starts at block 1100 and thereafter proceeds to block 1102. Block 1102 depicts an object detector system receiving multiple image streams, via stereoscopic image devices, and sensed data, via the stereoscopic image devices or one or more sensors. Next, block 1104 illustrates the object detector system attaching metadata to the image frames and sensed data, and the process passes to block 1106. In one example, metadata includes data such as, but not limited to, a camera identifier, frame number, timestamp, and pixel count.

Block 1106 depicts the object detector system processing each image stream and sensed data to detect and track objects, wherein objects may include physical objects and user movement indicative of a behavior. Next, block 1108 illustrates generating streams of tracked object properties with metadata from each stream. Thereafter, block 1110 depicts combining the tracked object properties to generate 3D object properties with metadata. Next, block 1112 illustrates transmitting the 3D tracked object properties to a behavior interpreter system, and the process ends.

Referring now to FIG. 12, a high level logic flowchart depicts a process and program for a behavior interpreter system of a behavior processing system enabling behavior prediction from tracked 3D object properties. In the example, the process starts at block 1200 and thereafter proceeds to block 1202. Block 1202 depicts a determination whether the behavior interpreter system receives 3D object properties. When the behavior interpreter system receives 3D object properties, then the process passes to block 1204. Block 1204 depicts filtering out any 3D object properties not associated with the behavior of a vehicle operator. Next, block 1206 depicts accessing a range of applicable behavior definitions indicative of potentially unsafe behavior, and the process passes to block 1208.

Block 1208 illustrates the behavior interpreter system comparing the filtered 3D object properties for tracked objects with the applicable behavior definitions. Next, block 1210 depicts the behavior interpreter system detecting at least one behavior definition with a closest match to one or more sets of filtered 3D object properties. Thereafter, block 1212 illustrates calculating a percentage probability that the 3D object properties are the actual behaviors in the matching behavior definitions. Next, block 1214 illustrates generating at least one predicted behavior record with any predicted behavior, percentage probability that the predicted behavior is correct, and other sensed data. Next, block 1216 depicts transmitting the predicted behavior records to a particular operator monitoring system controlling output of warnings to the identified vehicle operator, and the process ends.

With reference now to FIG. 13, a high level logic flowchart depicts a process and program for applying a predicted behavior record in a behavior-enabled operator monitoring system. As illustrated, the process starts at block 1300 and thereafter proceeds to block 1302. Block 1302 depicts a determination whether a behavior-enabled operator monitoring system receives a predicted behavior record. When the warning system receives a predicted behavior record, then the process passes to block 1304. Block 1304 illustrates accessing the current operational state of the vehicle associated with a time stamp for the predicted behavior record. Next, block 1306 depicts selecting at least one entry in a translation database matching the behavior type in the behavior record, the current operational state, and with a minimum probability threshold less than the percentage probability for the behavior record. Next, block 1308 illustrates translating the predicted behavior records and other collected data into one or more warning or other control signals. Thereafter, block 1310 illustrates controlling output of the warning or other control signals to selected controllers within a vehicle to inform an operator of unsafe behavior or disable a function of a vehicle due to unsafe behavior, and the process ends.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for automated detection of unsafe operation of a vehicle and automated response to detected unsafe operator of a vehicle, comprising:

capturing a three-dimensional movement of an operator of a vehicle, wherein the three-dimensional movement is determined using at least one image capture device aimed at the operator;

identifying a three-dimensional object properties stream using the captured movement;

identifying a particular defined behavior of the operator represented by the three-dimensional object properties stream by comparing the identified three-dimensional object properties stream with a plurality of behavior definitions;

identifying a current operational state of the vehicle;

identifying whether the particular defined behavior and the current operational state of the vehicle match at least one unsafe operation definition from among a plurality of unsafe operation definitions;

in response to matching the at least one unsafe operation definition, notifying the operator of the type of unsafe operation currently performed based on the at least one unsafe operation definition;

prompting the operator via an audio output interface of the vehicle to perform a particular step from among a plurality of operation training steps;

detecting the particular defined behavior of the operator and the current operational state of the vehicle;

determining whether the particular defined behavior matches an expected behavior in the particular step and whether the current operational state of the vehicle matches an expected operational state in the particular step;

responsive to determining the particular defined behavior matches the expected behavior in the particular step and the current operational state of the vehicle matches the expected operational state in the particular step, generating an output signal for output via the audio output interface indicating compliance and recording a record of the compliance;

responsive to determining at least one the particular defined behavior does not match the expected behavior in the particular step and the current operational state of the vehicle does not match the expected operational state in the particular step, determining whether a behavior translation database specifies triggering a training warning signal and at least one instruction for adjusting behavior for the particular defined behavior and the current operational state; and responsive to the behavior translation database specifying triggering the training warning signal for the particular defined behavior and the current operational state, outputting the training warning signal and the at least one instruction for adjusting behavior to ensure the safety of the operator during training.

2. The method according to claim 1, wherein capturing a three-dimensional movement of the operator of a vehicle further comprises capturing the three-dimensional movement using a stereoscopic image device to identify and track a particular three-dimensional movement of the operator.

3. The method according to claim 1, wherein identifying a particular defined behavior of the operator representing the three-dimensional object properties stream further comprises calculating a percentage probability that the captured three-dimensional movement represents a particular behavior defined in the particular behavior definition.

4. The method according to claim 1, wherein identifying a particular defined behavior of the operator representing the three-dimensional object properties stream further comprises identifying at least one of body movement of the operator comprising a fine granularity movement of at least one of a facial expression, an eye movement, a muscle contraction, and change in skin surface characteristics of the operator within the three-dimensional object properties stream matching at least one of the plurality of behavior definitions.

5. The method according to claim 1, wherein identifying whether the particular defined behavior and the current operational state of the vehicle match at least one unsafe operation definition from among a plurality of unsafe operation definitions, further comprises identifying whether a 3D position of the head and the eyes of the operator during the current operational state of the vehicle matches the unsafe 3D position of the head and eyes for the current operational state defined in the at least one unsafe operation definition.

6. The method according to claim 1, wherein identifying whether the particular defined behavior and the current operational state of the vehicle match at least one unsafe operation definition from among a plurality of unsafe operation definitions, further comprises identifying whether the detected behavior of the operator talking on a portable telephone device during the current operational state of the vehicle matches the unsafe portable telephone use behavior for the current operational state defined in the at least one unsafe operation definition.

7. The method according to claim 1, wherein notifying the operator of the type of unsafe operation currently performed based on the at least one unsafe operation definition further comprises:

generating at least one control signal from among a tactile output control signal, an audio output control signal and a graphical output control signal, wherein the at least one control signal controls output that notifies the operator of the type of unsafe operation; and controlling output of the at least one control signal to a controller for controlling the output that notifies the operator the type of unsafe operation.

8. The method according to claim 1, further comprising:
recording the particular defined behavior in a storage system separate from the vehicle via a network, responsive to the current operational state specifying at least one from among an airbag deployment, an antilock brake system actuation, and detecting damage to at least one part of the vehicle.

9. A system for automated detection of unsafe operation of a vehicle and automated response to detected unsafe operator of a vehicle, comprising:
a behavior processing system communicatively connected to a network, further comprising:
means for capturing a three-dimensional movement of an operator of a vehicle, wherein the three-dimensional movement is determined using at least one image capture device aimed at the operator;
means for identifying a three-dimensional object properties stream using the captured movement;
means for identifying a particular defined behavior of the operator represented by the three-dimensional object properties stream by comparing the identified three-dimensional object properties stream with a plurality of behavior definitions;
an operator monitoring system communicatively connected to the behavior processing system via the network, further comprising:
means for identifying a current operational state of the vehicle;
means for identifying whether the particular defined behavior and the current operational state of the vehicle match at least one unsafe operation definition from among a plurality of unsafe operation definitions;
means, in response to matching the at least one unsafe operation definition, for notifying the operator of the type of unsafe operation currently performed based on the at least one unsafe operation definition;
an operator training system for prompting the operator via an audio output interface of the vehicle to perform a particular step from among a plurality of operation training steps;
the operator training system for detecting the particular defined behavior of the operator and the current operational state of the vehicle;
the operator training system for determining whether the particular defined behavior matches an expected behavior in the particular step and whether the current operational state of the vehicle matches an expected operational state in the particular step;
the operator training system, responsive to determining the particular defined behavior matches the expected behavior in the particular step and the current operational state of the vehicle matches the expected operational state in the particular step, for generating an output signal for output via the audio output interface indicating compliance and recording a record of the compliance;
the operator training system, responsive to determining at least one the particular defined behavior does not match the expected behavior in the particular step and the current operational state of the vehicle does not match the expected operational state in the particular step, for determining whether a behavior translation database specifies triggering a training warning signal for the particular defined behavior and the current operational state; and
the operator training system, responsive to the behavior translation database specifying triggering the training warning signal for the particular defined behavior and the current operational state, for outputting the training warning signal to ensure the safety of the operator during training.

10. The system according to claim 9, wherein the means for capturing a three-dimensional movement of the operator of a vehicle further comprises means for capturing the three-dimensional movement using a stereoscopic image device to identify and track a particular three-dimensional movement of the operator.

11. The system according to claim 9, wherein the means for identifying a particular defined behavior of the operator representing the three-dimensional object properties stream further comprises means for identifying at least one of body movement of the operator comprising a fine granularity movement of at least one of a facial expression, an eye movement, a muscle contraction, and change in skin surface characteristics of the operator within the three-dimensional object properties stream matching at least one of the plurality of behavior definitions.

12. The system according to claim 9, wherein the means for identifying whether the particular defined behavior and the current operational state of the vehicle match at least one unsafe operation definition from among a plurality of unsafe operation definitions, further comprises means for identifying whether a 3D position of the head and the eyes of the operator during the current operational state of the vehicle matches the unsafe 3D position of the head and eyes for the current operational state defined in the at least one unsafe operation definition.

13. The system according to claim 9, wherein the means for identifying whether the particular defined behavior and the current operational state of the vehicle match at least one unsafe operation definition from among a plurality of unsafe operation definitions, further comprises means for identifying whether the detected behavior of the operator talking on a portable telephone device during the current operational state of the vehicle matches the unsafe portable telephone use behavior for the current operational state defined in the at least one unsafe operation definition.

14. The system according to claim 9, wherein the means for notifying the operator of the type of unsafe operation currently performed based on the at least one unsafe operation definition further comprises:
means for generating at least one control signal from among an audio output control signal and a graphical output control signal, wherein the at least one control signal controls output that notifies the operator of the type of unsafe operation; and
means for controlling output of the at least one control signal to a controller for controlling the output that notifies the operator the type of unsafe operation.

15. The system according to claim 9, the operator monitoring system further comprising means for recording the particular defined behavior in a storage system separate from the vehicle via a network, responsive to the current operational state specifying at least one from among an airbag deployment, an antilock brake system actuation, and detecting damage to at least one part of the vehicle.

16. A program product comprising a non-transitory storage-type computer-readable medium including a computer-readable program for automated detection of unsafe operation of a vehicle and automated response to detected unsafe operator of a vehicle, wherein the computer-readable program when executed on a computer causes the computer to:

capture a three-dimensional movement of an operator of a vehicle, wherein the three-dimensional movement is determined using at least one image capture device aimed at the operator;

identify a three-dimensional object properties stream using the captured movement;

identify a particular defined behavior of the operator represented by the three-dimensional object properties stream by comparing the identified three-dimensional object properties stream with a plurality of behavior definitions;

identify a current operational state of the vehicle;

identify whether the particular defined behavior and the current operational state of the vehicle match at least one unsafe operation definition from among a plurality of unsafe operation definitions;

in response to matching the at least one unsafe operation definition, notify the operator of the type of unsafe operation currently performed based on the at least one unsafe operation definition;

prompt the operator via an audio output interface of the vehicle to perform a particular step from among a plurality of operation training steps;

detect the particular defined behavior of the operator and the current operational state of the vehicle;

determine whether the particular defined behavior matches an expected behavior in the particular step and whether the current operational state of the vehicle matches an expected operational state in the particular step;

responsive to determining the particular defined behavior matches the expected behavior in the particular step and the current operational state of the vehicle matches the expected operational state in the particular step, generate an output signal for output via the audio output interface indicating compliance and recording a record of the compliance;

responsive to determining at least one the particular defined behavior does not match the expected behavior in the particular step and the current operational state of the vehicle does not match the expected operational state in the particular step, determine whether a behavior translation database specifies triggering a training warning signal and at least one instruction for adjusting behavior for the particular defined behavior and the current operational state; and responsive to the behavior translation database specifying triggering the training warning signal for the particular defined behavior and the current operational state, output the training warning signal and the at least one instruction for adjusting behavior to ensure the safety of the operator during training.

17. The program product of claim 16, wherein the computer-readable program when executed on a computer further causes the computer to capture the three-dimensional movement using a stereoscopic image device to identify and track a particular three-dimensional movement of the operator.

* * * * *